(12) United States Patent
Tajima et al.

(10) Patent No.: US 12,480,012 B2
(45) Date of Patent: Nov. 25, 2025

(54) INK JET RECORDING METHOD AND INK JET RECORDING APPARATUS

(71) Applicant: CANON KABUSHIKI KAISHA, Tokyo (JP)

(72) Inventors: Takahiro Tajima, Kanagawa (JP); Hiroshi Kakikawa, Kanagawa (JP); Masashi Yamamoto, Tokyo (JP); Atsuhito Yoshizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 909 days.

(21) Appl. No.: 17/568,772

(22) Filed: Jan. 5, 2022

(65) Prior Publication Data

US 2022/0242155 A1    Aug. 4, 2022

(30) Foreign Application Priority Data

Jan. 29, 2021 (JP) ................................. 2021-013658
Jan. 29, 2021 (JP) ................................. 2021-013659
Dec. 15, 2021 (JP) ................................. 2021-203243

(51) Int. Cl.
*C09D 11/322* (2014.01)
*B41J 2/01* (2006.01)
(Continued)

(52) U.S. Cl.
CPC ............. *C09D 11/322* (2013.01); *B41M 3/06* (2013.01); *C09D 11/30* (2013.01); *C09D 11/38* (2013.01); *B41J 2/01* (2013.01)

(58) Field of Classification Search
CPC ....... C09D 11/322; C09D 11/30; C09D 11/38; C09D 11/328; C09D 11/40; C09D 11/50; B41M 3/06; B41J 2/01
See application file for complete search history.

(56) References Cited

U.S. PATENT DOCUMENTS 4,756,963 A    7/1988 Yamamoto et al.
4,780,348 A    10/1988 Yamamato et al.
(Continued)

FOREIGN PATENT DOCUMENTS

EP    1090966 A1 *    4/2001    ............. C09D 11/40
EP    1167473 A1 *    1/2002    ............. C09D 11/40
(Continued)

OTHER PUBLICATIONS

English machine translation of JP 2002363455 A, Abe et al., published Dec. 18, 2002. (Year: 2024).*

(Continued)

*Primary Examiner* — Coris Fung
*Assistant Examiner* — Caroline D Liott
(74) *Attorney, Agent, or Firm* — Venable LLP

(57) ABSTRACT

Provided is an ink jet recording method that enables recording of an image with a wide expressible color gamut and high fluorescence intensity. The ink jet recording method comprises a step of recording an image by applying first and second inks to a recording medium by using an ink jet recording apparatus, including a recording head having ejection orifices configured to eject the first and second inks, respectively, such that an area where the first ink is applied and an area where the second ink is applied at least partially overlap each other. The first ink contains an alkaline buffer and a pigment particle dispersed by an effect of an anionic group, the second ink contains a fluorescent particle dispersed by an effect of an anionic group, and a density $\rho_1$ (g/cm$^3$) of the pigment particle is more than a density $\rho_2$ (g/cm$^3$) of the fluorescent particle.

22 Claims, 2 Drawing Sheets

(51) Int. Cl.
*B41M 3/06* (2006.01)
*C09D 11/30* (2014.01)
*C09D 11/38* (2014.01)

(56) References Cited

U.S. PATENT DOCUMENTS

| | | |
|---|---|---|
| 5,082,496 A | 1/1992 | Yamamato et al. |
| 5,123,960 A | 6/1992 | Shirota et al. |
| 5,127,946 A | 7/1992 | Eida et al. |
| 5,130,723 A | 7/1992 | Yamamoto et al. |
| 5,167,703 A | 12/1992 | Eida et al. |
| 5,178,671 A | 1/1993 | Yamamoto et al. |
| 5,213,614 A | 5/1993 | Eida et al. |
| 5,215,577 A | 6/1993 | Fida et al. |
| 5,215,578 A | 6/1993 | Eida et al. |
| 5,258,505 A | 11/1993 | Eida et al. |
| 5,415,686 A | 5/1995 | Kurabayashi et al. |
| 5,451,251 A | 9/1995 | Mafune et al. |
| 5,482,545 A | 1/1996 | Aoki et al. |
| 5,571,313 A | 11/1996 | Mafune et al. |
| 5,728,201 A | 3/1998 | Saito et al. |
| 5,888,284 A | 3/1999 | Engel |
| 5,911,815 A | 6/1999 | Yamamoto et al. |
| 6,003,987 A | 12/1999 | Yamamoto et al. |
| 6,007,182 A | 12/1999 | Matsubara et al. |
| 6,027,210 A | 2/2000 | Kurabayashi et al. |
| 6,062,674 A | 5/2000 | Inui et al. |
| 6,174,354 B1 | 1/2001 | Takizawa et al. |
| 6,186,615 B1 | 2/2001 | Sato et al. |
| 6,281,917 B1 | 8/2001 | Katsuragi et al. |
| 6,540,329 B1 * | 4/2003 | Kaneko .................. C09D 11/38 347/100 |
| 7,364,613 B2 | 4/2008 | Aoyama et al. |
| 8,408,691 B2 | 4/2013 | Koike et al. |
| 8,876,962 B2 | 11/2014 | Yamamoto et al. |
| 9,187,662 B2 | 11/2015 | Yamamoto et al. |
| 9,388,322 B2 | 7/2016 | Kakikawa et al. |
| 9,574,099 B2 | 2/2017 | Kawabe et al. |
| 9,809,721 B2 | 11/2017 | Yamamoto et al. |
| 9,957,399 B2 | 5/2018 | Okazaki et al. |
| 10,233,343 B2 | 3/2019 | Takebayashi et al. |
| 10,240,053 B2 | 3/2019 | Nushiro et al. |
| 10,253,200 B2 | 4/2019 | Kakikawa et al. |
| 2005/0284331 A1 | 12/2005 | Aoyama et al. |
| 2008/0036830 A1* | 2/2008 | Natori .................. C09D 11/32 347/100 |
| 2011/0234667 A1 | 9/2011 | Okubo et al. |
| 2018/0187034 A1* | 7/2018 | Takeno .................. B41M 5/00 |
| 2021/0001656 A1* | 1/2021 | Wakao .................. C09D 11/54 |
| 2022/0204793 A1* | 6/2022 | Taniguchi ............ B41J 2/04586 |

FOREIGN PATENT DOCUMENTS

| | | | |
|---|---|---|---|
| JP | 2002363455 A | * | 12/2002 |
| JP | 2005-264072 A | | 9/2005 |
| JP | 2005305892 A | * | 11/2005 |
| JP | 2008-063546 A | | 3/2008 |
| JP | 2017003818 A | * | 1/2017 |

OTHER PUBLICATIONS

English machine translation of JP 2005305892 A, Fujimoto et al., published Nov. 4, 2005. (Year: 2024).*
English machine translation of JP 2017003818 A, Kitao et al., published Jan. 5, 2017. (Year: 2024).*
Kamasak et al., IS&T's NIP17: International Conference on Digital Printing Technologies, "Dynamic Print Mode Control for Inkjet Printing," Sep. 30-Oct. 5, 2001. (Year: 2024).*
ChemBK.com, CI Pigment Red 122, copyright 2023. https://www.chembk.com/en/chem/CI Pigment Red 122. (Year: 2024).*
Caige Chemical, "Supply organic pigment, solvent dyes, Solvent Red 49," copyright 2020. https://I-color.com/pigments/tds/?color 122.html. (Year: 2024).*
Flexicon Corporation, "Bulk Handling Equipment & Systems, Carbon Black." (Year: 2024).*
"Yaws' Critical Property Date for Chemical Engineers and Chemists," Table 2. Physical Properties—Organic Compounds, peacock blue, Synonyms for peacock blue, Knovel 2014. (Year: 024).*
European Search Report issued in corresponding European Application No. 22152551.2 dated Jun. 23, 2022.

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

In recent years, an ink jet recording method is used to record an image on a recording medium for a poster application and the like and frequency of usage thereof is greatly increasing. In such applications, there are demands for a wide expressible color gamut and high image fastness. To meet such demands, for example, an ink containing a fine resin particle dyed with a fluorescent dye is proposed (Japanese Patent Application Laid-Open No. 2008-063546). Moreover, there is proposed an ink set including an ink containing a pigment and an ink containing a dispersed particle that is a mixture of a fluorescent coloring material and a resin (Japanese Patent Application Laid-Open No. 2002-363455).

The present inventors made studies on an ink containing a fluorescent particle (particle including a coloring material that exhibits fluorescence) to record an image with a wide expressible color gamut and excellent fastness. As a result, the present inventors found that, when the ink containing the fluorescent particle is used, the lightfastness of the recorded image tends to decrease. The coloring material that exhibits fluorescence absorbs short-wavelength light corresponding to an ultraviolet to visible range and emits light with a wavelength longer than the wavelength of the absorbed light. The coloring material having absorbed light transitions to an unstable excited state in which an energy state is high. Fluorescence refers to light emission that occurs when the coloring material returns from a singlet state in the excited state to a ground state. The singlet state is a very unstable state and a redox reaction is likely to occur. Accordingly, the coloring material that exhibits fluorescence is likely to degrade and has low lightfastness.

Next, the present inventors made studies on addition of a pigment to an ink containing a fluorescent particle. As a result, the present inventors found that using the ink containing the pigment together with the fluorescent particle improves the lightfastness of the recorded image. The lightfastness of the image is assumed to have improved due to mixing with the pigment with excellent lightfastness. However, the present inventors also found that the fluorescence intensity of the image decreases. Such a decrease in the fluorescence intensity is assumed to occur because fluorescent light emitted from the fluorescent particle is scattered or absorbed by the pigment present on the fluorescent particle and the fluorescence intensity decreases. Moreover, it was found that, since both the fluorescent particle and the pigment are contained in the same ink, the contents of the fluorescent particle and the pigment are fixed and the expressible color gamut cannot be increased. Furthermore, the present inventors studied the ink containing a fine resin particle dyed with a fluorescent dye that is proposed in Japanese Patent Application Laid-Open No. 2008-063546. As a result, it was found that the fluorescence intensity of the image was improved but the expressible color gamut was still small.

Moreover, the present inventors studied an image recorded by using the ink set proposed in Japanese Patent Application Laid-Open No. 2002-363455 and by applying the two types of inks to the recording medium such that the inks at least partially overlap each other. As a result, it was found that the expressible color gamut was increased but an increase in the fluorescence intensity of the image was difficult to achieve.

SUMMARY OF THE INVENTION

Accordingly, an object of the present invention is to provide an ink jet recording method that enables recording of an image with a wide expressible color gamut and high fluorescence intensity. Moreover, another object of the present invention is to provide an ink jet recording apparatus that uses this ink jet recording method.

Specifically, the present invention provides an ink jet recording method comprising a step of recording an image by applying a first ink and a second ink to a recording medium by using an ink jet recording apparatus such that an area where the first ink is applied and an area where the second ink is applied at least partially overlap each other, the ink jet recording apparatus including a recording head having ejection orifices configured to eject the first ink and the second ink, respectively, wherein the first ink contains an alkaline buffer and a pigment particle that is a pigment dispersed by an effect of an anionic group, the second ink contains a fluorescent particle dispersed by an effect of an anionic group, and a density $\rho_1$ (g/cm$^3$) of the pigment particle is more than a density $\rho_2$ (g/cm$^3$) of the fluorescent particle.

Further features of the present invention will become apparent from the following description of exemplary embodiments with reference to the attached drawings.

BRIEF DESCRIPTION OF THE DRAWINGS

FIG. 1A is a perspective view of a main portion of the ink jet recording apparatus and FIG. 1B is a perspective view of a head cartridge.

DESCRIPTION OF THE EMBODIMENTS

Figure 1A:
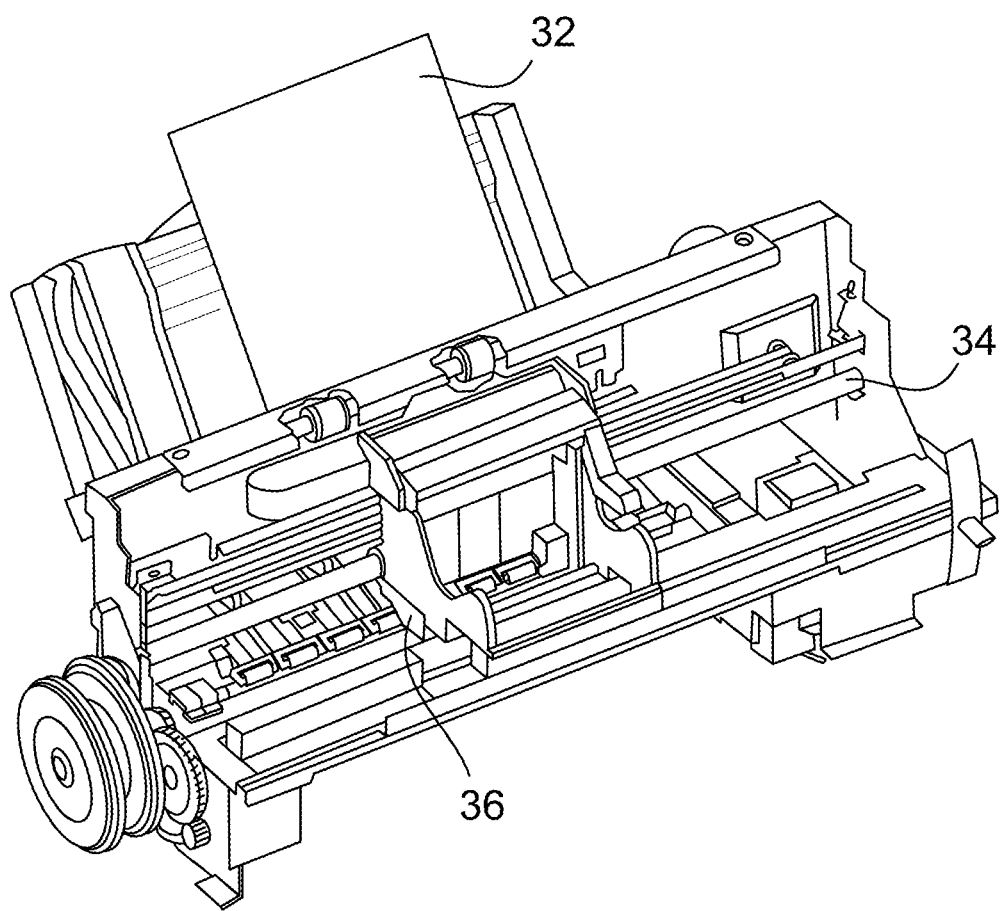
FIGS. 1A and 1B are views schematically illustrating an example of an ink jet recording apparatus used in an ink jet recording method of the present invention.

The present invention is described below in further details while giving an example of a preferable embodiment. In the present invention, when a compound is a salt, the compound is present in an ink in a state dissociated as ions but an expression of "contains a salt" is used for the sake of convenience. Moreover, an aqueous ink for ink jet is simply referred to as "ink" in some cases. Physical property values are values at normal temperature (25° C.) and normal pressure (one atmosphere) unless otherwise noted. A "unit" of a resin means a repeated unit derived from one monomer. Moreover, description of "(meth)acrylic acid" and "(meth)acrylate" means "acrylic acid, methacrylic acid" and "acrylate, methacrylate", respectively.

The present inventors made various studies on an ink jet recording method that enables recording of an image with a wide expressible color gamut and high fluorescence intensity. As a result, the inventors found that satisfying the following requirements (i) to (iv) can achieve recording of an image with high fluorescence intensity and a wide expressible color gamut.

(i) An image is recorded by applying a first ink and a second ink to a recording medium such that an area where the first ink is applied and an area where the second ink is applied partially overlap each other.

(ii) The first ink contains an alkaline buffer and a pigment particle that is a pigment dispersed by an effect of an anionic group.

(iii) The second ink contains a fluorescent particle dispersed by an effect of an anionic group.

(iv) The density $\rho_1$ (g/cm$^3$) of the pigment particle is more than the density $\rho_2$ (g/cm$^3$) of the fluorescent particle.

A general recording medium used in the ink jet recording method contains a cationic component. For example, a recording medium without a coating layer such as a plain paper contains a loading material such as calcium carbonate. Moreover, a recording medium with a coating layer such as a glossy paper and an art paper contains a proton, a cationic polymer, a cationic pigment and the like in the coating layer. Meanwhile, an anionic coloring material is normally used as a coloring material of an ink to improve fixability to the recording medium by means of cation-anion interaction.

Description is given of an example in which the second ink and the first ink are applied to the recording medium in this order to at least partially overlap each other. In this case, the fluorescent particle in the second ink applied to the recording medium first reacts with the cationic component in the recording medium and aggregates. Then, the first ink containing the pigment particle and the alkaline buffer is applied to the recording medium. Since the alkaline buffer is a component that exhibits a buffering effect of keep trapping the cationic component of the aggregated fluorescent particle, the alkaline buffer reduces the aggregation of the fluorescent particle by trapping the cationic component taken in by the fluorescent particle. Specifically, it is assumed that, when solid-liquid separation of the first ink applied to the recording medium occurs, the effect of the alkaline buffer reduces aggregation of both of the pigment particle and the fluorescent particle and causes both particles to be in a movable state and the fluorescent particle with a lower density moves to the upper side of the pigment particle. As a result, there is more pigment particle in a lower layer of a recorded image, that is a formed pigment layer, and there is more fluorescent particle in an upper layer. Thus, it is assumed that fluorescent light emitted from the fluorescent particle is less likely to suffer effects such as scattering by the pigment and absorption by the pigment and the fluorescence intensity improves. Since the aforementioned mechanism is caused by a relationship between the densities of the pigment particle and the fluorescent particle, a phenomenon similar to that described above occurs even if the application order of the inks is reversed, and the fluorescence intensity can be improved.

Since the molecule size of the alkaline buffer is smaller than those of the pigment particle and the fluorescent particle, the alkaline buffer permeates into the recording medium after the solid-liquid separation of the ink unlike the pigment particle and the fluorescent particle. Moreover, since the pigment particle present in the lower layer of the image is bonded to the cationic component in the recording medium by the cation-anion interaction, the fixability of the image to the recording medium is less likely to be degraded. Furthermore, since the first ink containing the pigment particle and the second ink containing the fluorescent particle are applied to the recording medium separately, the expressible color gamut can be easily increased.

<Ink jet Recording Method and Ink jet Recording Apparatus>

In the ink jet recording method of the present invention, there is used an ink jet recording apparatus including a recording head that has ejection orifices configured to eject the first ink and the second ink, respectively. Then, the ink jet recording method of the present invention includes a step (hereinafter, also referred to as "recording step") of recording an image by applying the first ink and the second ink to the recording medium such that the area where the first ink is applied and the area where the second ink is applied at least partially overlap each other. Moreover, the ink jet recording apparatus of the present invention is used in the ink jet recording method including the step of recording an image by applying the first ink and the second ink to the recording medium such that the area where the first ink is applied and the area where the second ink is applied at least partially overlap each other. Furthermore, the ink jet recording apparatus of the present invention includes the recording head that has ejection orifices configured to eject the first ink and the second ink, respectively. The first ink contains the alkaline buffer and the pigment particle that is a pigment dispersed by the effect of the anionic group and the second ink contains the fluorescent particle dispersed by the effect of the anionic group. Moreover, the density $\rho_1$ (g/cm$^3$) of the pigment particle is more than the density $\rho_2$ (g/cm$^3$) of the fluorescent particle.

Recording an image by applying the first ink and the second ink to the recording medium such that the area where the first ink is applied and the area where the second ink is applied at least partially overlap each other enables recording of an image with excellent lightfastness. When the area where the first ink is applied and the area where the second ink is applied do not overlap each other, the first ink and the second ink do not surely come into contact with each other on the recording medium. Accordingly, the pigment layer (image) having the lower layer in which a large amount of the pigment particle is present and the upper layer in which a large amount of the fluorescent particle is present cannot be formed. A pigment layer similar to an image recorded with an ink containing only the fluorescent particle as the coloring material is thereby formed and the lightfastness of the image is thus insufficient.

Whether the area where the first ink is applied and the area where the second ink is applied at least partially overlap each other can be checked from the image by observing the image with an instrument such as an optical microscope. For example, trade name "Measuring Microscope STM6" (manufactured by Olympus Corporation) or the like can be used as the optical microscope. The first ink and the second ink are preferably applied to the recording medium such that a dot of the first ink and a dot of the second ink overlap each other in a unit area. Any area such as one square inch, one pixel, or the like can be set as the unit area. For example, the unit area can be set in a unit of one pixel or the like. Specifically, the unit area is preferably an area of $\frac{1}{1200}$ inches×$\frac{1}{1200}$ inches or more to $\frac{1}{150}$ inches×$\frac{1}{150}$ inches or less, more preferably, an area of $\frac{1}{600}$ inches×$\frac{1}{600}$ inches or more to $\frac{1}{300}$ inches× $\frac{1}{300}$ inches or less.

Examples of a method of ejecting the inks from the ink jet type recording head may include a method of applying dynamic energy to the inks and a method of applying thermal energy to the inks. Among these methods, the method of ejecting the inks by applying thermal energy to the inks is particularly preferable.

Figure 1B:
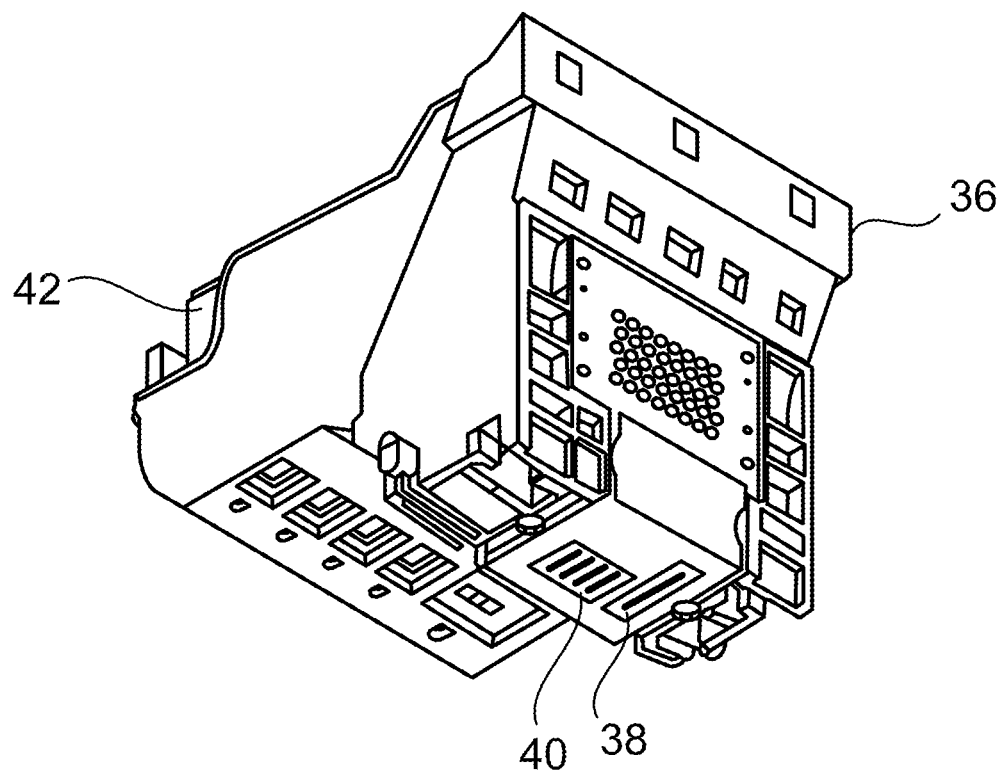

FIGS. 1A and 1B are views schematically illustrating an example of the ink jet recording apparatus used in the ink jet recording method of the present invention, FIG. 1A is a perspective view of a main portion of the ink jet recording apparatus and FIG. 1B is a perspective view of a head cartridge. The ink jet recording apparatus is provided with a conveyance unit (not illustrated) that conveys the recording medium 32 and a carriage shaft 34. A head cartridge 36 can be mounted on the carriage shaft 34. The head cartridge 36 includes recording heads 38 and 40 and is configured such that an ink cartridge 42 is set in the head cartridge 36. The inks (not illustrated) are ejected from the recording heads 38 and 40 toward the recording medium 32 while the head cartridge 36 is conveyed in a main scanning direction along the carriage shaft 34. Then, the conveyance unit (not illustrated) conveys the recording medium 32 in a sub-scanning direction and the image is thereby recorded on the recording medium 32.

In the recording step, the ink jet recording apparatus preferably uses a serial type recording head and applies the first ink and the second ink to the unit area of the recording medium by performing main scanning of the recording head 4 or more times to 16 or less times. The main scanning is a direction of reciprocating scanning of the recording head and the recording medium is conveyed in a direction orthogonal to the main scanning (sub-scanning direction). When the number of times of the main scanning of the recording head in which the first ink and the second ink are applied to the unit area is less than 4, an amount of the inks applied in one operation of the main scanning in recording of a certain image increases. Then, time required to reach a state where aggregation of both of the pigment particle and the fluorescent particle has decreased becomes long. Accordingly, cation-anion interaction occurs between the cation of the alkaline buffer trapping the cationic component and each of the pigment particle and the fluorescent particle dispersed by the effect of the anionic group, and the pigment particle and the fluorescent particle become more likely to aggregate in the solid liquid separation of the first ink in some cases. Formation of the pigment layer separated into two layers of the upper layer containing a large amount of fluorescent particle and the lower layer containing a large amount of pigment particle is thereby hindered and the fluorescence intensity of the image may slightly decrease. Meanwhile, when the number of times of the main scanning of the recording head in which the first ink and the second ink are applied to the unit area of the recording medium is more than 16, the amount of the inks applied in one operations of the main scanning in recording of a certain image decreases. Then, the time required to reach the state where the aggregation of both of the pigment particle and the fluorescent particle has decreased becomes short. The fluorescent particle and the pigment particle are thus more likely to aggregate due to the cationic component included in the recording medium, and formation of the pigment layer separated into two layers of the upper layer containing a large amount of fluorescent particle and the lower layer containing a large amount of pigment particle is thereby hindered in some cases. The fluorescence intensity of the image may thus slightly decrease.

(Ink)

The first ink and the second ink are used in the ink jet recording method of the present invention. The first ink contains the alkaline buffer and the pigment particle. The second ink contains the fluorescent particle dispersed by the effect of the anionic group. When the term "inks" is simply used, this term means both of the "first ink" and the "second ink". Components and the like forming the inks used in the ink jet recording method of the present invention are described below in detail.

[Pigment Particle]

The coloring material of the first ink is the pigment particle that is a pigment dispersed by the effect of the anionic group. The content (% by mass) of the pigment particle in the first ink is preferably 0.10% by mass or more to 10.00% by mass or less based on the total mass of the ink. The density $\rho_1$ (g/cm$^3$) of the pigment particle contained in the first ink is more than the density $\rho_2$ (g/cm$^3$) of the fluorescent particle contained in the second ink. When the density $\rho_1$ (g/cm$^3$) of the pigment particle is equal to or less than the density $\rho_2$ (g/cm$^3$) of the fluorescent particle, a large amount of the fluorescent particle is assumed to be present below the pigment particle in the solid liquid separation of the first ink. A pigment layer having a lower layer containing a large amount of the fluorescent particle and an upper layer containing a large amount of the pigment particle is thereby formed. Accordingly, fluorescent light emitted by the fluorescent particle in the lower layer is scattered or absorbed by the pigment particle in the upper layer and the fluorescence intensity becomes insufficient. The density $\rho_1$ (g/cm$^3$) of the pigment particle is preferably 1.45 g/cm$^3$ or more to 5.00 g/cm$^3$ or less, more preferably, 1.50 g/cm$^3$ or more to 2.00 g/cm$^3$ or less. The second ink preferably contains no pigment particle dispersed by the effect of the anionic group.

The densities of the pigment particle and the fluorescent particle can be measured in conformity with JIS Z8807:2012 when the pigment particle and the fluorescent particle are measurement targets. The densities of the pigment particle and the fluorescent particle in the inks can be measured by using a density/specific gravity meter (for example, trade name "portable density/specific gravity meter DA-130N" (manufactured by Kyoto Electronics Manufacturing Co., Ltd.) or the like). In the measurement of the densities of the pigment particle and the fluorescent particle in the inks, the content (% by mass) of each of the pigment particle and the fluorescent particle in the ink is preferably adjusted to 1.0% by mass or more to 10.00% or less based on the total mass of the ink by concentrating the ink or diluting the ink with water.

Also when any of the inks contains multiple types of pigment particles or multiple types of fluorescent particles, a density measured by using the ink as described above may be considered as the density $\rho_1$ (g/cm$^3$) of the pigment particle or the density $\rho_2$ (g/cm$^3$) of the fluorescent particle. Since the aforementioned phenomenon occurs in particles satisfying the relationship of $\rho_1 > \rho_2$ also in this case, the fluorescence intensity of the image can be further improved. Although the method of measuring the densities of the pigment particle and the fluorescent particle by using the inks is described above, the densities may be measured by using the pigment particle and the fluorescent particle appropriately separated from the inks.

For example, the density of the pigment particle can be adjusted as follows. The pigment has a unique density depending on the type thereof. The density can be controlled by using a method of using the pigment particle dispersed by the effect of the anionic group as the pigment that is dispersion method. For example, in the dispersion method in which a resin dispersant is used, the density of the pigment particle can be adjusted by controlling the composition of the resin, the ratio between the pigment and the resin dispersant and the like.

The first ink contains the pigment particle that is a pigment dispersed by the effect of the anionic group. When the pigment particle is not dispersed by the effect of the anionic group, no electrostatic repulsion is generated between the pigment particle and the fluorescent particle in the solid liquid separation of the first ink, and the pigment particle and the fluorescent particle are thus more likely to bond to each other. Accordingly, the pigment layer that has the lower layer containing a large amount of the pigment particle and the upper layer containing a large amount of the fluorescent particle is less likely to be formed and the fluorescence intensity of the image is insufficient.

The pigment in the first ink preferably satisfies the relationship of the following formula (1), more preferably satisfies the relationship of the following formula (2).

$$A_{\lambda 2}/A_{\lambda 1} \leq 0.5 \qquad \text{formula (1)}$$

$$A_{\lambda 2}/A_{\lambda 1} \leq 0.4 \qquad \text{formula (2)}$$

$A_{\lambda 1}$: Absorbance of the pigment particle at the maximum absorption wavelength $\lambda_1$ (nm) of the pigment particle.
$A_{\lambda 2}$: Absorbance of the pigment particle at the maximum fluorescence wavelength $\lambda_2$ (nm) of the fluorescent particle.

In order to improve the fluorescence intensity of the image, it is preferable that there is more pigment particle in the lower layer of the pigment layer and there is more fluorescent particle in the upper layer of the pigment layer. In this case, it is preferable that the absorbance $A_{\lambda 2}$ of the pigment particle at the maximum fluorescence wavelength $\lambda_2$ (nm) of the fluorescent particle in the second ink is less than the absorbance $A_{\lambda 1}$ of the pigment particle at the maximum absorption wavelength $\lambda_1$ (nm) of the pigment particle. The fluorescent light emitted by the fluorescent particle is thereby less likely to be absorbed by the pigment particle and the fluorescence intensity of the image can be thereby further improved. When the pigment particle does not satisfy the relationship of the formula (1) described above, that is the value of "$A_{\lambda 2}/A_{\lambda 1}$" is larger than 0.5, the fluorescent light emitted by the fluorescent particle is likely to be absorbed by the pigment particle and the effect of improving the fluorescence intensity of the image slightly decreases in some cases. The value of "$A_{\lambda 2}/A_{\lambda 1}$" is preferably 0.0 or more.

Normally, the absorbance of the ink containing the pigment particle can be considered as the "absorbance of the pigment particle". The absorption spectrum of the ink containing the pigment particle can be measured by using a spectrophotometer (for example, trade name "U-3900/3900H" (manufactured by Hitachi High-Tech Corporation) or the like). The fluorescent spectrum of the fluorescent particle can be measured by using a fluorescence spectrophotometer (for example, trade name "F-2700" (manufactured by Hitachi High-Tech Corporation) or the like). The maximum absorption wavelength $\lambda_1$ (nm) of the pigment particle and the maximum fluorescence wavelength (nm) of the fluorescent particle are obtained in a range of 380 to 800 nm that is a visible light range of the measured spectra. Each of the maximum absorption wavelength $\lambda_1$ (nm) and the maximum fluorescence wavelength $\lambda_2$ (nm) is a wavelength that satisfies the following conditions: a value obtained by differentiating a corresponding one of the absorbance and the fluorescence intensity in the spectra once with respect to the wavelength is closest to 0; and a value obtained by differentiating a corresponding one of the absorbance and the fluorescence intensity in the spectra twice with respect to the wavelength is a negative value. Note that, in a pigment particle with no maximum absorption wavelength such as carbon black, a wavelength at which the absorbance takes the maximum value in the range of 380 to 800 nm is set as the "maximum absorption wavelength".

Also when the ink contains multiple types of pigment particles and multiple types of fluorescent particles, the maximum absorption wavelength measured by using the inks as described above can be considered as the maximum absorption wavelength $\lambda_1$ (nm) of the pigment particle and the maximum fluorescence wavelength $\lambda_2$ (nm) of the fluorescent particle. Also in this case, the aforementioned phenomenon occurs in the particles in which the value of "$A_{\lambda 2}/A_{\lambda 1}$" satisfies the aforementioned relationship, and the fluorescence intensity of the image can be thus further improved. Although the method of measuring the absorbance of the pigment particle and the fluorescent particle by using the inks is described above, the absorbance may be measured by using the pigment particle and the fluorescent particle appropriately separated from the inks. Since the absorbance of the pigment particle and the fluorescent particle mainly depends on the type of coloring material, the absorbance is adjusted by appropriately selecting the type of coloring material.

Any pigment constituting the pigment particle may be used as long as the pigment satisfies the aforementioned density relationship. Note that the pigment used in the first ink does not have to be a pigment that emits fluorescent light, and is preferably a non-fluorescent pigment. Specific examples of the pigment may include inorganic pigments such as carbon black and titanium oxide and organic pigments such as quinacridone, perinone, perylene, dioxazine, azo, phthalocyanine, isoindolinone, imidazolone and diketopyrrolopyrrole. Among these, at least one pigment selected from the group consisting of carbon black, quinacridone, perinone, perylene, dioxazine, azo and phthalocyanine is preferable and quinacridone is particularly preferable because the fluorescence intensity can be further improved. The content (% by mass) of the pigment in the first ink is preferably 0.10% by mass or more to 10.00% or less based on the total mass of the ink.

The pigment is preferably a pigment formed of a molecule having a fused ring constituted of fusing of five or more rings. Since the pigment formed of a molecule having a fused ring constituted of fusing of five or more rings has many conjugated systems in which single bonds and multiple bonds are continuously arranged in the molecule, many delocalized π electrons are present in the pigment. Accordingly, π interaction occurs between particles of the pigment particle and bonding force between the particles is strong. Description is given of an example in which the first ink and the second ink are applied to the recording medium in this order to partially overlap each other. In this case, the second ink is applied onto the pigment particle in the first ink aggregated on the recording medium. In the pigment particle formed of a molecule having a fused ring constituted of fusing of five or more rings, the bonding force between the particles is strong and the aggregation is less likely to decrease when the second ink is applied. Accordingly, the pigment particle aggregated in the lower layer is less likely to move to the upper layer when the second ink is applied. Thus, the pigment layer that has the lower layer containing a large amount of the pigment particle and the upper layer containing a large amount of the fluorescent particle is more likely to be formed, and the fluorescence intensity can be further improved.

Examples of a skeleton of the pigment formed of a molecule having a fused ring constituted of fusing of five or more rings may include a quinacridone skeleton, a dioxazine skeleton, a perylene skeleton and the like. Examples of the pigment having a fused ring constituted of fusing of five or more rings in a molecular structure may include C.I. Pigment Violet 19 and 23, C.I. Pigment Red 122 and 149, C.I. Pigment Orange 43, and the like. Moreover, carbon black is also the pigment formed of a molecule having a fused ring constituted of fusing of five or more rings.

The pigment particle only needs to be dispersed by the effect of the anionic group and the dispersion method is not limited to a particular method. For example, it is possible to use pigments such as a resin dispersed pigment in which the pigment is dispersed with a resin dispersant including the anionic group, a micro-capsule pigment in which a particle surface of the pigment are at least partially coated with a resin including the anionic group. Moreover, pigments such as a pigment dispersed with a surfactant including the anionic group can be used. Furthermore, it is possible to use pigments such as a self-dispersing pigment in which a functional group including the anionic group is bonded to the particle surface of the pigment and a pigment (resin bonded type self-dispersing pigment) in which an organic group including a polymer having the anionic group is chemically bonded to the particle surface of the pigment. Moreover, pigments of different dispersion methods may be used in combination.

A pigment in which the anionic group such as a carboxylic acid group, a sulfonic acid group, or a phosphonic acid group is bonded to the particle surface of the pigment directly or via another atom group (—R—) can be used as the self-dispersing pigment. The anionic group may be either an acid type or a salt type and, in the case of the salt type, may be partially or completely disassociated. Examples of a cation to be a counter ion in the case where the anionic group is the salt type may include an alkaline metal cation, ammonium, organic ammonium and the like. Specific examples of another atom group (—R—) may include linear or branched alkylene groups with 1 to 12 carbon atoms, arylene groups such as a phenylene group and a naphthylene group, a carbonyl group, an imino group, an amide group, a sulfonyl group, an ester group, an ether group and the like. Moreover, a group obtained by combining these groups may be used.

The resin dispersant used in an aqueous ink normally contains a hydrophilic unit including the anionic group and a hydrophobic unit including no anionic group. The hydrophilic unit is a unit for securing a hydrophilic property to an aqueous vehicle. The hydrophobic unit is a unit for adsorption to the particle surface of the pigment by hydrophobic interaction. Examples of the resin dispersed pigment may include a type that achieves dispersion by making the resin dispersant physically adsorb to the particle surface of the pigment, a micro-capsule pigment in which the particle surface of the pigment is coated with the resin dispersant and the like.

A water-soluble resin is preferably used as the resin dispersant. The "water-soluble resin" in this specification means a resin that dissolves into an aqueous vehicle and that may be present in the aqueous vehicle without forming a particle with a particle size. If the resin dispersant is water dispersible (not-water-soluble), the storage stability of the ink tends to slightly decrease in some cases. The content (% by mass) of the resin dispersant in the ink is preferably 0.10% by mass or more to 5.00% or less based on the total mass of the ink.

Whether the resin used as the resin dispersant is water-soluble or not can be determined according to the method described below. First, a liquid (resin solid content: 10% by mass) containing a resin neutralized by an alkaline (sodium hydroxide, potassium hydroxide, or the like) corresponding to an acid value is prepared. Next, a specimen solution is prepared by diluting the prepared liquid by 10 times (based on volume) of pure water. Then, when the particle size of the resin in the specimen solution is measured by dynamic light scattering and no particle with a particle size is measured, the resin can be determined to be water-soluble. For example, measurement conditions in this case can be set as follows.

[Measurement Conditions]
  Set Zero: 30 seconds
  Number of times of measurement: 3
  Measurement time: 180 seconds A particle size analyzer (for example, trade name "UPA-EX150" manufactured by Nikkiso Co., Ltd.) using dynamic light scattering or the like can be used as a particle size distribution measurement apparatus. The used particle size distribution measurement apparatus, the measurement conditions and the like are not limited those described above as a matter of course.

The dispersion method of the pigment is preferably the resin dispersed pigment in which the pigment is dispersed by the resin dispersant including the anionic group. Effects of the resin dispersant include an effect of a hydrophobic unit of the resin dispersant physically adsorbing to the particle surface of the pigment and an effect of dispersing the pigment by hydration of a hydrophilic unit. In the recording medium to which the ink is applied, steric repulsion caused by the resin dispersant occurs between the particles of the pigment particle and between the pigment particle and the fluorescent particle when the solid liquid separation between a liquid component and each of the pigment particle and the fluorescent particle occurs. Accordingly, the pigment particle slowly aggregates. In this case, a large amount of the pigment particle with a larger density is likely to be present below the fluorescent particle, and the pigment layer that has the upper layer containing a large amount of the fluorescent particle and the lower layer containing a large amount of the pigment particle is formed. Thus, the fluorescence intensity can be further improved.

[Alkaline Buffer]

The first ink contains the alkaline buffer. The alkaline buffer is a component having a buffering capacity in an alkaline range of pH 7.0 or more. Using the first ink containing the alkaline buffer enables recording of an image with high fluorescence intensity. The alkaline buffer preferably has pKa (acid dissociation constant) of 7.6 or more to 10.4 or less at 25° C. The value of the pKa is a physical property value used as an index of basicity strength of a compound. The larger the value of pKa is, the higher the basicity of the compound is and the higher the capacity of trapping the cationic component is. When pKa of the alkaline buffer is less than 7.6, the capacity of trapping the cationic component is slightly low and an effect of trapping the cationic component of the fluorescent particle may be insufficient in some cases. Accordingly, the pigment layer that has the lower layer containing a large amount of the pigment particle and the upper layer containing a large amount of the fluorescent particle may become less likely to be formed. Thus, the effect of improving the fluorescence intensity may slightly decrease.

Meanwhile, when pKa of the alkaline buffer is more than 10.4, the capacity of trapping the cationic component is slightly high and the alkaline buffer trapping the cationic component is likely to present in a cation state. Accordingly, the cation-anion interaction may become more likely to occur between the alkaline buffer in the cation state and each of the pigment particle and the fluorescent particle dispersed by the effect of the anionic group. This facilitates aggregation of the pigment particle and the fluorescent particle, and the pigment layer that has the lower layer containing a large amount of the pigment particle and the upper layer containing a large amount of the fluorescent particle may become less likely to be formed. Thus, the effect of improving the fluorescence intensity may slightly decrease.

An ionization equilibrium of an acid expressed by HA is expressed as HA⇌H$^+$A$^-$, and Ka that is an equilibrium constant is expressed as Ka=[H$^+$]×[A$^-$]/[HA]. The acid dissociation constant is a negative common logarithm of this equilibrium constant and is defined as pKa=−log$_{10}$ Ka. In this specification, a value of pKa at 25° C. is used. The acid dissociation constant pKa can be calculated by neutralization titration by using a pH measurement apparatus (for example, trade name "798MPT Titrino" manufactured by Metrohm AG) or the like. When the alkaline buffer has multiple dissociation stages, pKa only needs to be within the aforementioned range in at least one of the dissociation stages. An alkaline buffer in which the highest one of the pKa values in the multiple dissociation stages is within the aforementioned range is more preferable.

Examples of the alkaline buffer may include diethanolamine (8.9), diisopropanolamine (8.1), triethanolamine (7.8), triisopropanolamine (8.1), tributylamine (10.0), trihexylamine (10.5), N-cyclohexyl-3-aminopropanesulfonic acid (10.5), N-cyclohexyl-2-aminoethanesulfonic acid (9.3), N,N-bis(2-hydroxyethyl)glycine (8.4) and the like. The numerical values in the parentheses attached to the aforementioned compound names are values of pKa at 25° C. The alkaline buffer is preferably an amine compound, more preferably, a tertiary amine compound. Since the tertiary amine compound generates higher steric repulsion against the pigment particle and the fluorescent particle than primary and secondary amine compounds, trapped protons from the pigment particle and the fluorescent particle are less likely to return to the pigment particle and the fluorescent particle. A large amount of the pigment particle with a larger density is thus likely to be present below the fluorescent particle, and the pigment layer that has the upper layer containing a large amount of the fluorescent particle and the lower layer containing a large amount of the pigment particle is formed. Thus, the fluorescence intensity can be further improved.

The contents (% by mass) of the alkaline buffer in the first ink is preferably 0.01% by mass or more to 5.00% or less based on the total mass of the ink, more preferably, 0.10% by mass or more to 3.00% or less.

[Fluorescent Particle]

The second ink contains the fluorescent particle dispersed by the effect of the anionic group. The density $\rho_1$ (g/cm$^3$) of the pigment particle contained in the first ink is more than the density $\rho_2$ (g/cm$^3$) of the fluorescent particle contained in the second ink. The density $\rho_2$ (g/cm$^3$) of the fluorescent particle is preferably 1.00 g/cm$^3$ or more to 1.50 g/cm$^3$ or less, more preferably 1.00 g/cm$^3$ or more to 1.45 g/cm$^3$ or less. The first ink preferably contains no fluorescent particle.

The density of the fluorescent particle can be measured in the aforementioned method. The density of the fluorescent particle can be adjusted in a method similar to that for the density of the pigment particle. For example, when the fluorescent particle is a resin particle (including the anionic group) dyed with a coloring material that exhibits fluorescence (fluorescent dye, fluorescent pigment), it is only necessary to take the unique density of the coloring material that exhibits fluorescence into consideration. Moreover, the density can be adjusted by adjusting a composition of a resin that forms the resin particle and that includes the anionic group, the ratio between the resin and the coloring material that exhibits fluorescence and the like. Furthermore, when the fluorescent particle is the fluorescence pigment dispersed by the effect of the anionic group, the adjustment of the density can be performed in a method similar to that for the pigment particle.

The "fluorescent particle" in this specification refers to a particle that is made to emit fluorescent light by an ultraviolet or visible light excitation ray. Whether a certain particle is the "fluorescent particle" that exhibits fluorescence or not can be determined according to, for example, the method described below. A specimen obtained by dispersing the particle in a liquid in which the particle can be dispersed is irradiated with an ultraviolet ray (ultraviolet light) that has a long wavelength (about 315 to 400 nm) and that is barely visible to the eyes, by using a black light or the like. If light with a color different from that of the ultraviolet light emitted from the black light is visually observed, the particle can be determined to be the "fluorescent particle" that exhibits fluorescence. A commercially-available product (for example, trade name "SLUV-4" (manufactured by AS ONE Corporation) or the like) can be used as the black light.

Examples of the fluorescent particle may include a resin particle dyed with a fluorescent dye and a fluorescent pigment such as C.I. Pigment Yellow 101. The fluorescent dye in the resin particle dyed with the fluorescent dye can be analyzed according to, for example, a procedure described below. The resin particle taken out from the ink according to a routine procedure is dissolved into an organic solvent such as chloroform to prepare a specimen. The fluorescent dye is isolated from the prepared specimen by using high performance liquid chromatography (HPLC). The isolated dye is analyzed by general structural analysis methods such as nuclear magnetic resonance (NMR) spectroscopy and matrix assisted laser desorption/ionization-mass spectrometry (MALDI-MS).

A basic dye, an acid dye, a disperse dye, an oil-soluble dye and the like can be used as the fluorescent dye. Among these, the basic dye is preferable. Examples of the skeleton of the dye may include xanthene, azine, azole, thiazole, azo, diarylmethane, triarylmethane, acridine, coumarin, methine and the like. Among these, compounds having the skeleton of xanthene, coumarin and the like are preferable and compounds having the xanthene skeleton are more preferable. The compounds having the xanthene skeleton have, although varying to some extent depending on the structures thereof, densities of about 1.0 g/cm$^3$ and tend to have far less densities than the pigment particle. Accordingly, a large amount of the pigment particle with a larger density is likely to be present below the fluorescent particle, and the pigment layer that has the upper layer containing a large amount of the fluorescent particle and the lower layer containing a large amount of the pigment particle is formed. Thus, the fluorescence intensity can be further improved.

The basic dye is a compound that exhibits fluorescence and that includes an amino group or an imino group (may form a salt) in a molecular structure thereof. Examples of the compound that includes an amino group or an imino group in a molecular structure thereof may include "dyes that include 'basic' in the names described in the color index" and the like. The color index is a database of coloring materials established by Society of Dyers and Colourists and the like.

Specific examples of the basic dye that exhibits fluorescence may include C.I. Basic Red 1, 1:1, 2, 4, 8, 11, 12 and 13, C.I. Basic Violet 1, 3, 10, 11, 11:1 and 14, Rhodamine 19 and 575, C.I. Basic Yellow 1, 2, 9, 13, 24, 37, 40 and 96, C.I. Basic Blue 7, C.I. Basic green 1, C.I. Fluorescent Brightener 363 and the like, as described in C.I. numbers and general names. Among these, C.I. Basic Red 1 and 1:1, C.I. Basic Violet 11 and 11:1, C.I. Basic Yellow 40 and the like are preferable due to excellent coloring property.

The acid dye is a compound that exhibits fluorescence and that includes an acid group (may form a salt) such as a carboxylic acid group or a sulfonic acid group in a molecular structure thereof. Examples of the compound that includes an acid group in a molecular structure thereof may include "dyes that include 'acid' in the names described in the color index" and the like. Specific examples of the acid dye that exhibits florescence may include C.I. Acid Blue 9, C.I. Acid Yellow 7, C.I. Acid Yellow 23, C.I. Acid Red 52, C.I. Acid Red 87, C.I. Acid Red 92, C.I. Acid Black 2 and the like, as described in C.I. numbers.

The disperse dye is a compound that exhibits fluorescence and that does not dissolve into water or has low water-solubility. Examples of the "disperse dye" may include "dyes that include 'disperse' in the names described in the color index" and the like. Examples of the skeleton of the dye may include azo, coumarin, anthraquinone and the like. Among these, compounds having the skeleton of coumarin, anthraquinone and the like are preferable and compounds having the coumarin skeleton are more preferable.

Specific examples of the distribute dye that exhibits fluorescence may include C.I. Disperse Yellow 82 and 186, C.I. Disperse Red 58 and 60, C.I. Disperse Orange 11 and the like, as described in C.I. numbers. Among these, C.I. Disperse Yellow 82 and the like are preferable due to excellent coloring property.

The oil-soluble dye is a compound that exhibits fluorescence and that does not dissolve into water or has low water-solubility. Examples of the "oil-soluble dye" may include "dyes that include 'solvent' in the names described in the color index" and the like. Examples of the skeleton of the dye may include coumarin, xanthene, azo, aminoketone, anthraquinone and the like. Among these, compounds having the skeleton of coumarin, xanthene and the like are preferable and compounds having the coumarin skeleton are more preferable.

Specific examples of the oil-soluble dye that exhibits fluorescence may include C.I. Solvent Yellow 7, 43, 44, 85, 98, 131, 160:1, 172 and 196, C.I. Solvent Red 43, 44, 45, 49 and 149, C.I. Solvent Orange 5, 45, 63 and 115 and the like, as described in C.I. numbers. Among these, C.I. Solvent Yellow 160:1 and 196 and the like are preferable due to excellent coloring property.

The coloring material that exhibits fluorescence is preferably the basic dye. Since the alkaline buffer trapping protons has a positive charge, electrostatic repulsion is generated between the alkaline buffer and the basic dye. Thus, the trapped protons from the pigment particle and the fluorescent particle are less likely to return to the pigment particle and the fluorescent particle. Accordingly, a large amount of the pigment particle with a larger density is likely to be present below the fluorescent particle, and the pigment layer that has the upper layer containing a large amount of the fluorescent particle and the lower layer containing a large amount of the pigment particle is formed. Thus, the fluorescence intensity can be further improved.

The content (% by mass) of the fluorescent particle in the second ink is preferably 0.10% by mass or more to 15.00% or less based on the total ink amount, more preferably 1.00% by mass or more to 10.00% or less.

A resin particle having a so-called core-shell structure that include a core portion and a shell portion coating the core portion is preferably used as the resin particle forming the "resin particle dyed with the fluorescent dye". The core portion preferably includes an aromatic group containing unit and a cyano group containing unit. Moreover, the shell portion preferably includes an aromatic group containing unit and an anionic group containing unit and may further include a unit derived from a crosslinking agent or the like.

A monomer to be the aromatic group containing unit by polymerization is preferably a monomer that includes one polymerizable functional group such as an ethylenically unsaturated bond in the molecule. Among such monomers, styrene and derivatives thereof are more preferable and styrene and vinyltoluene are particularly preferable due to excellent reactivity in polymerization and excellent stability of the resin particle to be obtained.

A monomer to be the cyano group containing unit by polymerization is preferably a monomer that includes one polymerizable functional group such as an ethylenically unsaturated bond in the molecule. Among such monomers, acrylonitrile and methacrylonitrile are particularly preferable due to excellent reactivity in polymerization and excellent stability of the resin particle to be obtained.

An anionic group in the anionic group containing unit is preferably an anionic group that includes one polymerizable functional group such as an ethylenically unsaturated bond in the molecule. Specific examples include a carboxylic acid group, a phenolic hydroxy group, a phosphoester group and the like. Among these, the carboxylic acid group is preferable due to excellent stability of the resin particle in the ink. The anionic group may be either an acid type or a salt type and, in the case of the salt type, may be partially or completely disassociated. Examples of a cation to be a counter ion in the case where the anionic group is the salt type include an alkaline metal cation, ammonium, organic ammonium and the like.

The core portion and the shell portion of the resin particle may include units other than those described above as long as the effects of the present invention are not impaired. The units other than those described above preferably include one polymerizable functional group in the molecule, and specific examples thereof include a unit derived from an ethylenically unsaturated monomer and the like.

The cumulative 50% particle size (D50) of the resin particle based on the volume is preferably 120 nm or less. If the cumulative 50% particle size (D50) of the resin particle based on the volume is larger than 120 nm, light scattering due to the resin particle is likely to occur and the coloring property of an image slightly decreases in some cases. The cumulative 50% particle size (D50) of the resin particle based on the volume is preferably 50 nm or more.

[Method of Producing Dyed Resin Particle]

The resin particle can be produced according to a conventional, publicly-known method such as, for example, an emulsion polymerization method, a mini-emulsion polymerization method, a seeded polymerization method, or a phase inversion emulsion method. Examples of a method of dying the resin particle may include methods such as a method of forming the resin particle by polymerizing a monomer mixed liquid in which the fluorescent dye is dissolved and a method of adding the fluorescent dye to the resin particle and heating it. Among these, the method of adding the fluorescent dye to the resin particle and heating it is preferable because this method can be applied to a wider variety of fluorescent dyes.

[Method of Testing Resin Particle]

The configuration of the resin particle can be tested according to a method described in the following sections (i) to (iii). Although a method of extracting the resin particle from the ink and analyzing and testing the resin particle is described below, similar analysis and testing can be performed also for the resin particle extracted from an aqueous dispersion.

(i) Extraction of Resin Particle

The resin particle can be separated and extracted from the ink containing the resin particle by density-gradient centrifugation. In a density-gradient sedimentation velocity method among methods of the density-gradient centrifugation, the resin particle is separated and extracted by using differences in coefficients of sedimentation of components. Meanwhile, in a density-gradient sedimentation equilibrium method among methods of the density-gradient centrifugation, the resin particle is separated and extracted by using differences in densities of components.

(ii) Check and Separation of Layer Structure

The resin particle is dyed and immobilized with ruthenium tetroxide and is then embedded in an epoxy resin to be stably held therein. Next, the resin particle embedded in the epoxy resin is cut with an ultramicrotome and a cross section of the resin particle is observed by using a scanning transmission electron microscope (STEM). Observing the cut cross section passing through the center of gravity of the resin particle enables checking of the layer structure of the resin particle. Quantitative analysis of elements contained in each of layers (core portion, shell portion) forming the resin particle can be performed with STEM-energy dispersive X-ray spectrometry (EDX) also including EDX by using the resin particle embedded in the epoxy resin as an analysis specimen.

(iii) Analysis of Units (Monomers) Forming Resins in Respective Layers

The resin particle to be used as a specimen for separation of resins in the respective layer may be in a state of a disperse liquid. Alternatively, the resin particle dried and formed into a film may be used as the specimen. The resin particle to be used as the specimen is dissolved into an organic solvent. Then, the layers thereof are separated from one another by gel permeation chromatography (GPC) and the resins forming the respective layers are collected. Then, the collected resins are subjected to element analysis by a combustion method. Aside from this, resins collected by an acid digestion (hydrofluoric acid addition) method or an alkali fusion method are subjected to pretreatment and then subjected to quantitative analysis of inorganic components by inductively coupled plasma atomic emission spectroscopy. The results of the element analysis and the results of the quantitative analysis of inorganic components are compared with the results of the quantitative analysis of the elements with STEM-EDX obtained in (ii) described above and we can thereby know the layers of the resin particle formed of the collected resins.

Moreover, the collected resins are analyzed by nuclear magnetic resonance (NMR) spectroscopy and matrix assisted laser desorption/ionization-mass spectrometry (MALDI-MS). We can thereby know the units (monomers) forming the resins and the types and proportions of cross-linking components. Moreover, monomers generated by depolymerization can be directly detected by analyzing resins collected by pyrolysis gas chromatography.

[Siloxane Compound]

The first ink preferably contains a nonionic siloxane compound. Using the first ink containing the nonionic siloxane compound can improve fixability of a secondary color image recorded together with the second ink. The siloxane compound is a compound having a siloxane structure (Si—O) and is preferably a compound to which a nonionic hydrophilic group such as an ethylene oxide group or a hydroxy group is bonded. Moreover, a compound with weight-average molecular weight of 500 or more to 5,000 or less is preferable as the siloxane compound. Examples of such a siloxane compound may include a modified siloxane compound and the like and compounds that are commercially-available as silicone oil, silicone based surfactant and the like can be used. The content (% by mass) of the nonionic siloxane compound in the first ink is preferably 0.10% by mass or more to 3.00% or less based on the total mass of the ink, more preferably 0.50% by mass or more to 2.00% or less. Particularly, when the first ink contains the nonionic siloxane compound and the fluorescent particle of the second ink is the resin particle dyed with the basic dye, the fixability of the secondary color image can be particularly improved.

[Aqueous Vehicle]

Each of the inks is preferably an aqueous ink that contains at least water as an aqueous vehicle. The ink may further contain a water-soluble organic solvent as the aqueous vehicle. Deionized water or ion-exchanged water is preferably used as water. The content (% by mass) of the water in the ink is preferably 50.00% by mass or more to 95.00% or less based on the total mass of the ink. Moreover, any solvent generally used in inks may be used as the water-soluble organic solvent. Examples of the solvent may include alcohols, (poly)alkylene glycols, glycol ethers, nitrogen containing compounds, sulfur containing compounds and the like. The content (% by mass) of the water-soluble organic solvent in the inks is preferably 3.00% by mass or more to 50.00% or less based on the total mass of the ink.

[Other Additives]

The inks may contain, in addition to the components described above, water soluble organic compounds that are solid at normal temperature, for example, polyhydric alcohols such as trimethylolpropane and trimethylolethane, urea and urea derivatives such as ethyleneurea as necessary. The inks may also contain various additives such as surfactant, pH adjuster, antirust agent, antiseptic, fungicide, oxidation inhibitor, reduction inhibitor, evaporation promoter, chelating agent and other resins as necessary.

[Physical Properties of Ink]

It is preferable that the physical property values of each of the inks are appropriately controlled for application to the ink jet method. Specifically, the static surface tension of the ink at 25° C. measured by a plate method is preferably 30 mN/m or more to 50 mN/m or less. Moreover, the viscosity of the ink at 25° C. is preferably 2.0 mPa·s or more to 10.0 mPa·s or less. Furthermore, pH of the ink at 25° C. is preferably 5.0 or more to 10.0 or less, more preferably 7.0 or more to 9.5 or less.

EXAMPLES

The present invention is described below in further details by using examples and comparative examples. Note that the present invention is not limited by the following examples and any configuration may be employed as long as it does not depart from the scope of the present invention. The description of "part" and "%" regarding the content amounts are based on mass unless otherwise noted. The acid value of each resin was measured. by potentiometric titration using a potassium hydroxide-methanol titrant solution. The weight-average molecular weight of each resin is a value against polystyrene standard measured by gel permeation chromatography (GPC).

<Preparation of Pigment Dispersed Liquids>
(Pigment Dispersed Liquid 1)

First, 10.0 parts of a pigment, 10.0 parts of a resin dispersant aqueous solution and 80.0 parts of water were mixed and dispersed for one hour with a sand grinder and then not-dispersed objects including coarse particles were removed by centrifugal separation. C.I. Pigment Red 122 was used as the pigment. The resin dispersant aqueous solution was an aqueous solution that was obtained by neutralizing styrene-acrylic acid copolymer with an acid value of 115 mgKOH/g and a weight-average molecular weight of 10,000 with potassium hydroxide equimolar to the acid value and adding an appropriate amount of ion-exchanged water and that has a resin content of 20.0%. Pressure filtering was performed by using a micro filter (manufactured by Fujifilm Corporation) with a pore size of 3.0 μm and then an appropriate amount of ion-exchanged water was added to prepare a pigment dispersed liquid 1. The content of the pigment in the pigment dispersed liquid 1 was 10.0% and the content of the resin was 2.0%.

(Pigment Dispersed Liquid 2)

A pigment dispersed liquid 2 was obtained in the same procedure as that for the pigment dispersed liquid 1 except for the point that the type of pigment was changed to C.I. Pigment Orange 43. The content of the pigment in the pigment dispersed liquid 2 was 10.0% and the content of the resin was 2.0%.

(Pigment Dispersed Liquid 3)

A pigment dispersed liquid 3 was obtained in the same procedure as that for the pigment dispersed liquid 1 except for the point that the type of pigment was changed to C.I. Pigment Red 149. The content of the pigment in the pigment dispersed liquid 3 was 10.0% and the content of the resin was 2.0%.

(Pigment Dispersed Liquid 4)

A pigment dispersed liquid 4 was obtained in the same procedure as that for the pigment dispersed liquid 1 except for the point that the type of pigment was changed to carbon black (trade name "Printex 85" (manufactured by Orion Engineered Carbons SA). The content of the pigment in the pigment dispersed liquid 4 was 10.0% and the content of the resin was 2.0%.

(Pigment Dispersed Liquid 5)

A pigment dispersed liquid 5 was obtained in the same procedure as that for the pigment dispersed liquid 1 except for the point that the type of pigment was changed to C.I. Pigment Violet 23. The content of the pigment in the pigment dispersed liquid 5 was 10.0% and the content of the resin was 2.0%.

(Pigment Dispersed Liquid 6)

A pigment dispersed liquid 6 was obtained in the same procedure as that for the pigment dispersed liquid 1 except for the point that the type of pigment was changed to C.I. Pigment Yellow 74. The content of the pigment in the pigment dispersed liquid 6 was 10.0% and the content of the resin was 2.0%.

(Pigment Dispersed Liquid 7)

A pigment dispersed liquid 7 was obtained in the same procedure as that for the pigment dispersed liquid 1 except for the point that the type of pigment was changed to C.I. Pigment Green 7. The content of the pigment in the pigment dispersed liquid 7 was 10.0% and the content of the resin was 2.0%.

(Pigment Dispersed Liquid 8)

A pigment dispersed liquid 8 was obtained in the same procedure as that for the pigment dispersed liquid 1 except for the point that the type of pigment was changed to C.I. Pigment Blue 15:3. The content of the pigment in the pigment dispersed liquid 8 was 10.0% and the content of the resin was 2.0%.

(Pigment Dispersed Liquid 9)

A solution obtained by dissolving 50 g of concentrated hydrochloric acid into 55 g of water was cooled to 5° C. and 8.3 g of 4-amino-1,2-benzenedicarboxylic acid was added to the solution in this state. A container containing this solution was put in an ice bath and a solution obtained by dissolving 9.9 g of sodium nitrite into 20.0 g of water at 5° C. was added to the solution in the container while the solution was agitated and the temperature of solution was maintained at 10° C. or less. After stirring of 15 minutes, C.I. Pigment Red 122 was added while being agitated. Stirring was performed for another 15 minutes to obtain slurry. The obtained slurry was filtered with a filter paper (trade name "standard filter paper No. 2" (manufactured by ADVANTEC) and a particle was sufficiently cleaned with water and dried in an oven at 110° C. Thereafter, sodium ions were substituted by potassium ions by an ion-exchanging method and a self-dispersing pigment in which a —$C_6H_3$—$(COOK)_2$ group was bonded to the particle surface of the pigment was obtained. The content of the pigment was adjusted by adding an appropriate amount of water and a pigment dispersed liquid 9 with a pigment content of 10.0% was obtained.

(Pigment Dispersed Liquid 10)

A polyamine-based cationic resin (trade name "Catiofast PR8154" manufactured by BASF) was added to pure water and dissolved to obtain a resin aqueous solution. C.I. Pigment Red 122 was added to the obtained resin aqueous solution and was sufficiently agitated with an agitator to obtain the dispersed liquid. The content of C.I. Pigment Red 122 (pigment) in the dispersed liquid was 10.0%. Moreover, the content of the cationic resin in the dispersed liquid was 8 parts with respect to 100 parts of the pigment. An appropriate amount of pure water was added to obtain a pigment dispersed liquid 10 with a pigment content of 10.0% and a resin content of 8.0%.

(Pigment Dispersed Liquid 11)

A pigment dispersed liquid 11 was obtained in the same procedure as that for the pigment dispersed liquid 1 except for the point that the type of pigment was changed to C.I. Pigment Yellow 155. The content of the pigment in the pigment dispersed liquid 11 was 10.0% and the content of the resin was 2.0%.

(Pigment Dispersed Liquid 12)

A pigment dispersed liquid 12 was obtained in the same procedure as that for the pigment dispersed liquid 1 except for the point that the type of pigment was changed to C.I. Pigment Red 150. The content of the pigment in the pigment dispersed liquid 12 was 10.0% and the content of the resin was 2.0%.

Details of the pigment dispersed liquids 1 to 12 are described in Table 1. In "specific ring structure" in the items of Table 1, the case where the "pigment was formed of a molecule that had a fused ring obtained by fusing of five or more rings" is denoted by "○" and the case where the "pigment was formed of a molecule that had no fused ring obtained by fusing of five or more rings in the molecular structure" is denoted by "x". The densities of the pigment particle and the fluorescent particle to be described later were measured according to JIS Z8807:2012.

TABLE 1

Preparation Conditions of Pigment Dispersed Liquids

| | | | | Features | | | | |
|---|---|---|---|---|---|---|---|---|
| | Pigment | | | | | | | Density $\rho_1$ of |
| Pigment | | | Specific | Content (%) | | | | pigment |
| Dispersed | | | ring | | Resin | Pigment | | particle |
| Liquid | Type of Pigment | Structure | structure | Pigment | dispersant | particle | Dispersion form | (g/cm$^3$) |
| 1 | C.I. Pigment Red 122 | Quinacridone | o | 10.0 | 2.0 | 12.0 | Anionic Resin-Dispersed | 1.50 |
| 2 | C.I. Pigment Orange 43 | Perinone | o | 10.0 | 2.0 | 12.0 | Anionic Resin-Dispersed | 1.76 |
| 3 | C.I. Pigment Red 149 | Perylene | o | 10.0 | 2.0 | 12.0 | Anionic Resin-Dispersed | 1.50 |
| 4 | Carbon black | Carbon black | o | 10.0 | 2.0 | 12.0 | Anionic Resin-Dispersed | 1.80 |
| 5 | C.I. Pigment Violet 23 | Dioxazine | o | 10.0 | 2.0 | 12.0 | Anionic Resin-Dispersed | 1.50 |
| 6 | C.I. Pigment Yellow 74 | Azo | x | 10.0 | 2.0 | 12.0 | Anionic Resin-Dispersed | 1.50 |
| 7 | C.I. Pigment Green 7 | Phthalocyanine | x | 10.0 | 2.0 | 12.0 | Anionic Resin-Dispersed | 1.85 |
| 8 | C.I. Pigment Blue 15:3 | Phthalocyanine | x | 10.0 | 2.0 | 12.0 | Anionic Resin-Dispersed | 1.50 |
| 9 | C.I. Pigment Red 122 | Quinacridone | o | 10.0 | 0.0 | 10.0 | Anionic Resin-Dispersed | 1.50 |
| 10 | C.I. Pigment Red 122 | Quinacridone | o | 10.0 | 8.0 | 18.0 | Cationic Resin-Dispersed | 1.50 |
| 11 | C.I. Pigment Yellow 155 | Azo | x | 10.0 | 2.0 | 12.0 | Anionic Resin-Dispersed | 1.40 |
| 12 | C.I. Pigment Red 150 | Azo | x | 10.0 | 2.0 | 12.0 | Anionic Resin-Dispersed | 1.30 |

<Preparation of Fluorescent Particle Dispersed Liquids>
(Fluorescent Particle Dispersed Liquid 1)

A reaction container to which a stirring device was attached was set in a warm water tank. Then, 1,178 parts of water was put into the reaction container and the inner temperature was maintained at 70° C. A solution obtained by mixing 233 parts of styrene, 233 parts of acrylonitrile and 18 parts of reactive surfactant (trade name "SR-10" manufactured by ADEKA Corporation) and a solution obtained by mixing 1.9 parts of potassium persulfate and 659 parts of water were simultaneously added dropwise over 60 minutes into the reaction container while being agitated. After completion of dropwise addition, stirring was performed for another 30 minutes and a core particle to be a core portion of the resin particle was formed.

A first solution was prepared by mixing 16 parts of styrene, 12 parts of methacrylic acid, 32 parts of ethylene glycol dimethacrylate (crosslinking agent component), 20 parts of ethylene glycol diglycidyl ether (crosslinking agent component) and 2.5 parts of reactive surfactant. Trade name "SR-10" (manufactured by ADEKA Corporation) was used as the reactive surfactant. Moreover, a second solution was prepared by mixing 0.1 parts of potassium persulfate and 133 parts of water. The prepared first solution and second solution were simultaneously added dropwise over 10 minutes into the reaction container while being agitated. After completion of the dropwise addition, stirring was performed for another 5 hours at 80° C. to form a shell portion, and the resin particle having a core-shell structure including the core portion and the shell portion was prepared.

An 8 mol/L potassium hydroxide aqueous solution was added to the reaction container to adjust pH to 8.5 and then a dye solution prepared by dissolving a fluorescent dye into water was added into the reaction container without addition of a surfactant. C.I. Basic Red 1 and C.I. Basic Violet 11 that were both compounds exhibiting fluorescence and having xanthene skeletons were used as the fluorescent dye. The solution was heated to 80° C. and agitated for 2 hours to dye the resin particle. The amount of the dye was adjusted to 5 parts with respect to 100 parts of total of the monomer, the cross-linking agent and the dye forming the resin particle. The 8 mol/L potassium hydroxide aqueous solution was added into the reaction chamber to adjust pH to 8.5. Water was further added for dilution and a fluorescent particle dispersed liquid 1 was obtained. The content of the fluorescent particle in the fluorescent particle dispersed liquid 1 was 20.0% and the density $\rho_2$ of the fluorescent particle was 1.00 g/cm$^3$.

(Fluorescent Particle Dispersed Liquid 2)

A fluorescent particle dispersed liquid 2 was obtained in the same procedure as that for the fluorescent particle dispersed liquid 1 except for the point that the type of fluorescent dye was changed to C.I. Disperse Yellow 82 that was a disperse dye exhibiting fluorescence. The content of the fluorescent particle in the fluorescent particle dispersed liquid 2 was 20.0% and the density $\rho_2$ of the fluorescent particle was 1.00 g/cm$^3$.

(Fluorescent Particle Dispersed Liquid 3)

First, 20.0 parts of a resin particle (trade name "DayGlo ZQ-15 blaze orange" manufactured by DayGlo Color Corporation) dyed with C.I. Basic Red 1:1, 20 parts of a resin dispersant aqueous solution and 60.0 parts of water were mixed and dispersed for one hour with a sand grinder. Thereafter, not-dispersed objects including coarse particles were removed by performing centrifugal separation. The resin dispersant aqueous solution was the same as that used in the preparation of the pigment dispersed liquid 1. Pressure filtering was performed by using a micro filter (manufactured by Fujifilm Corporation) with a pore size of 3.0 μm and then an appropriate amount of ion-exchanged water was added to prepare a fluorescent particle dispersed liquid 3. The content of the fluorescent particle in the fluorescent particle dispersed liquid 3 was 24.0%. The density $\rho_2$ of the fluorescent particle was 1.10 g/cm$^3$.

(Fluorescent Particle Dispersed Liquid 4)

A fluorescent particle dispersed liquid 4 was obtained in the same procedure as that for the fluorescent particle dispersed liquid 3 except for the point that the resin particle was changed to a resin particle (trade name "DayGlo T-15 blaze orange" manufactured by DayGlo Color Corporation) dyed with C.I. Basic Red 1:1. The content of the fluorescent particle in the fluorescent particle dispersed liquid 4 was 24.0%. Moreover, the density $\rho_2$ of the fluorescent particle was 1.40 g/cm$^3$.

<Preparation of Dye Aqueous Solution>

A fluorescent dye aqueous solution was obtained by dissolving C.I. Acid Red 52 that was a dye exhibiting fluorescence into water. The content of the dye in the fluorescent dye aqueous solution was 20.0%.

<Preparation of Siloxane Compound>

A siloxane compound (weight-average molecular weight 2,832) having a structure expressed by the following formula (1) was used.

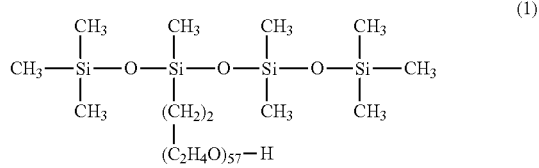

<Preparation of Inks>
(Inks 1-1 to 1-23)

The components (unit: %) described in Table 2 were mixed and sufficiently agitated and then pressure filtering was performed by using a micro filter (manufactured by Fujifilm Corporation) with a pore size of 3.0 μm to prepare each ink. A numerical value attached to polyethylene glycol in Table 2 is a number average molecular weight and "Acetylenol E100" is a trade name of the nonionic surfactant (acetylene glycol ethylene oxide adduct) manufactured by Kawaken Fine Chemicals Co., Ltd. Numerical values in parentheses attached to the compound names in Table 2 are values of pKa of the respective compounds at 25° C. A pH meter (trade name "F-21" manufactured by Horiba Ltd.) was used to measure pH of the prepared inks and the pH of each ink was within a range of 7.0 or more to 9.5 or less.

TABLE 2-1

Compositions and Features of Inks

| | Ink | | | | | | | | | |
|---|---|---|---|---|---|---|---|---|---|---|
| | 1-1 | 1-2 | 1-3 | 1-4 | 1-5 | 1-6 | 1-7 | 1-8 | 1-9 | 1-10 |
| Pigment Dispersed Liquid 1 | 40.00 | 40.00 | | | | | | | | |
| Pigment Dispersed Liquid 2 | | | 40.00 | | | | | | | |
| Pigment Dispersed Liquid 3 | | | | 40.00 | | | | | | |
| Pigment Dispersed Liquid 4 | | | | | 40.00 | | | | | |
| Pigment Dispersed Liquid 5 | | | | | | 40.00 | | | | |
| Pigment Dispersed Liquid 6 | | | | | | | 40.00 | | | |
| Pigment Dispersed Liquid 7 | | | | | | | | 40.00 | | |
| Pigment Dispersed Liquid 8 | | | | | | | | | 40.00 | |
| Pigment Dispersed Liquid 9 | | | | | | | | | | 40.00 |
| Pigment Dispersed Liquid 10 | | | | | | | | | | |
| Pigment Dispersed Liquid 11 | | | | | | | | | | |
| Pigment Dispersed Liquid 12 | | | | | | | | | | |
| Fluorescent Particle Dispersed Liquid 1 | | | | | | | | | | |
| Triethanolamine (7.8) | 0.50 | 0.50 | 0.50 | 0.50 | 0.50 | 0.50 | 0.50 | 0.50 | 0.50 | 0.50 |
| 3-morpholinopropane-sulfonic acid (7.2) | | | | | | | | | | |
| 4-(2-hydroxyethyl)-1-piperazineethanesulfonic acid (7.6) | | | | | | | | | | |
| Triisopropanolamine (8.1) | | | | | | | | | | |
| N,N-bis(2-hydroxyethyl) glycine (8.4) | | | | | | | | | | |
| N-cyclohexyl-2-aminoethane-sulfonic acid (9.3) | | | | | | | | | | |
| N-cyclohexyl-3-aminopropane-sulfonic acid (10.4) | | | | | | | | | | |
| Ethylamine (10.6) | | | | | | | | | | |
| Siloxane compound | | 1.00 | | | | | | | | |
| Glycerin | 15.00 | 15.00 | 15.00 | 15.00 | 15.00 | 15.00 | 15.00 | 15.00 | 15.00 | 15.00 |
| Triethylene glycol | 8.00 | 8.00 | 8.00 | 8.00 | 8.00 | 8.00 | 8.00 | 8.00 | 8.00 | 8.00 |
| Polyethylene glycol 1000 | 1.00 | 1.00 | 1.00 | 1.00 | 1.00 | 1.00 | 1.00 | 1.00 | 1.00 | 1.00 |
| Acetylenol E100 | 0.20 | 0.20 | 0.20 | 0.20 | 0.20 | 0.20 | 0.20 | 0.20 | 0.20 | 0.20 |
| Pure water | 35.30 | 34.30 | 35.30 | 35.30 | 35.30 | 35.30 | 35.30 | 35.30 | 35.30 | 35.30 |
| Content (%) of Pigment Particle | 4.80 | 4.80 | 4.80 | 4.80 | 4.80 | 4.80 | 4.80 | 4.80 | 4.80 | 4.00 |

TABLE 2-2

Compositions and Features of Inks

| | Ink | | | | | | | | | | | | |
|---|---|---|---|---|---|---|---|---|---|---|---|---|---|
| | 1-11 | 1-12 | 1-13 | 1-14 | 1-15 | 1-16 | 1-17 | 1-18 | 1-19 | 1-20 | 1-21 | 1-22 | 1-23 |
| Pigment Dispersed Liquid 1 | 40.00 | 40.00 | 40.00 | 40.00 | 40.00 | 40.00 | 40.00 | | | 40.00 | | | 20.00 |
| Pigment Dispersed Liquid 2 | | | | | | | | | | | | | |
| Pigment Dispersed Liquid 3 | | | | | | | | | | | | | |
| Pigment Dispersed Liquid 4 | | | | | | | | | | | | | |
| Pigment Dispersed Liquid 5 | | | | | | | | | | | | | |
| Pigment Dispersed Liquid 6 | | | | | | | | | | | | | |
| Pigment Dispersed Liquid 7 | | | | | | | | | 40.00 | | | | |
| Pigment Dispersed Liquid 8 | | | | | | | | | | | | | |
| Pigment Dispersed Liquid 9 | | | | | | | | | | | | | |
| Pigment Dispersed Liquid 10 | | | | | | | | | 40.00 | | | | |
| Pigment Dispersed Liquid 11 | | | | | | | | | | | 40.00 | | |
| Pigment Dispersed Liquid 12 | | | | | | | | | | | | 40.00 | |
| Fluorescent Particle Dispersed Liquid 1 | | | | | | | | | | | | | 20.00 |
| Triethanolamine (7.8) | | | | | | | | | | 0.50 | 0.50 | 0.50 | 0.25 |
| 3-morpholinopropane-sulfonic acid (7.2) | 0.50 | | | | | | | | 0.50 | | | | |
| 4-(2-hydroxyethyl)-1-piperazineethanesulfonic acid (7.6) | | 0.50 | | | | | | | | | | | |
| Triisopropanolamine (8.1) | | | 0.50 | | | | | | | | | | |
| N,N-bis(2-hydroxyethyl) glycine (8.4) | | | | 0.50 | | | | | | | | | |
| N-cyclohexyl-2-aminoethane-sulfonic acid (9.3) | | | | | 0.50 | | | | | | | | |
| N-cyclohexyl-3-aminopropanesulfonic acid (10.4) | | | | | | 0.50 | | | | | | | |
| Ethylamine (10.6) | | | | | | | 0.50 | | | | | | |
| Siloxane compound | | | | | | | | | | | | | |
| Glycerin | 15.00 | 15.00 | 15.00 | 15.00 | 15.00 | 15.00 | 15.00 | 15.00 | 15.00 | 15.00 | 15.00 | 15.00 | 15.00 |
| Triethylene glycol | 8.00 | 8.00 | 8.00 | 8.00 | 8.00 | 8.00 | 8.00 | 8.00 | 8.00 | 8.00 | 8.00 | 8.00 | 8.00 |
| Polyethylene glycol 1000 | 1.00 | 1.00 | 1.00 | 1.00 | 1.00 | 1.00 | 1.00 | 1.00 | 1.00 | 1.00 | 1.00 | 1.00 | 1.00 |
| Acetylenol E100 | 0.20 | 0.20 | 0.20 | 0.20 | 0.20 | 0.20 | 0.20 | 0.20 | 0.20 | 0.20 | 0.20 | 0.20 | 0.20 |
| Pure water | 35.30 | 35.30 | 35.30 | 35.30 | 35.30 | 35.30 | 35.30 | 35.30 | 35.30 | 35.80 | 35.30 | 35.30 | 35.55 |
| Content (%) of Pigment Particle | 4.80 | 4.80 | 4.80 | 4.80 | 4.80 | 4.80 | 4.80 | 4.80 | 7.20 | 4.80 | 4.80 | 4.80 | 2.40 |

(Ink 1-24)

The components described below were mixed to obtain a mixture.

Pigment Dispersed Liquid 11: 140 parts
Styrene butadiene copolymer latex: 56 parts
Ethylene glycol: 150 parts
Diethylene glycol: 120 parts
Anionic surfactant: 4 parts
Antiseptic: 2 parts
Sodium hydroxide: 0.1 parts
Sodium dioctyl sulfosuccinate: 0.1 parts
Potassium nitrate: 1.8 parts Trade name "Nipol SX1105" (manufactured by Zeon Corporation, Japan, solid content 45%) was used as styrene butadiene copolymer latex. Trade name "Pelex OT-P" (manufactured by Kao Corporation) was used as the anionic surfactant. Trade name "Proxel" (manufactured by Lonza Group AG) was used as the antiseptic. Ion-exchanged water was added to the obtained mixture such that the total amount became 1,000 parts. After sufficient stirring, the mixture was filtered twice with a millipore filter filtering machine with a pore size of 1 μm to obtain the ink 1-24. The content of the pigment particle in the ink 1-24 was 1.68%.

(Ink 1-25)

A flask to which a cooling pipe, a thermometer, a separating funnel and a stirring device were attached was set in a water bath. Then, 440 parts of water, 8.5 parts of sodium dodecylbenzene sulfonate and 7 parts of nonionic surfactant (trade name "Emulgen LS-110" manufactured by Kao Corporation) were put into the flask and were heated to 80° C. After addition of 2.1 parts of potassium persulfate, a mixture (monomer liquid) of 140 parts of acrylonitrile, 120 parts of styrene and 13 parts of acrylic acid was added dropwise over 3 hours into the flask and polymerized for 4 hours to obtain a polymer. Then, 200 parts of water, 0.3 parts of Rhodamine F3B, 2.0 parts of Rhodamine F4G and 17.5 parts of a special polycarboxylate type polymer surfactant (trade name "Demol EP" manufactured by Kao Corporation) were added to the obtained polymer while being agitated at normal temperature. Trade name "Basonyl Red 560" (manufactured by BASF) was used as Rhodamine F3B. Trade name "Basonyl Red 485" (manufactured by BASF) was used as Rhodamine F4G. After uniform mixing, the temperature was gradually increased and dying was performed for 1 hour at 85° C. to obtain a fine particle dispersed liquid containing a fluorescent fine particle having an average particle size of 90 nm and a brilliant pink color. Water was added for dilution and a fluorescent particle dispersed liquid (A) with a solid content density of 40% was obtained.

After the components described below were pre-mixed, circulation dispersion processing was performed for 20 hours by using a disc type bead mill (trade name "KDL type" manufactured by Shinmaru Enterprises Corporation, zirconia balls with a diameter of 0.3 mmφ was used) to obtain a pigment dispersed liquid (A). The average particle size of the pigment particle in the obtained pigment dispersed liquid (A) was 95.0 nm.

C.I. Pigment Red 122: 151 parts

Polyoxyethylene (n=40) β-naphthyl ether: 57 parts

Distilled water: 796 parts

The component (ii) described below was added to the component (i) described below and then agitated for 30 minutes to obtain a pigment dispersed liquid (B).

(i) Pigment dispersed liquid (A): 34.0 parts (ii) Self-emulsifying anionic polyether type polyurethane emulsion (trade name "Takelac W-5025" manufactured by Mitsui Chemicals, Inc., solid content: 30.0%, average particle size=20.3 nm): 10.0 parts.

Next, the component (iv) described below was added to the component (iii) described below and then agitated for 30 minutes to obtain a pigment dispersed liquid (C).

(iii) Pigment dispersed liquid (B): 44.0 parts (iv) Fluorescent particle dispersed liquid (A): 30.0 parts A mixed liquid of the components (v) to (viii) described below was added to the obtained pigment dispersed liquid (C) and then agitated for 30 minutes. Filtering with a membrane filter with a pore size of 0.8 μm was performed and then vacuum degassing was performed to obtain an ink 1-25. The content of the pigment particle in the ink 1-25 was 4.89% and the content of the fluorescent particle was 8.33%.

(v) Glycerin: 5.0 parts (vi) Diethylene glycol: 15.0 parts (vii) 1-amino-2-ethyl-2,3-propanediol: 2.0 parts (viii) Distilled water: 4.0 parts (Inks 2-1 to 2-5)

The components (unit: %) described in Table 3 were mixed and sufficiently agitated and then pressure filtering was performed by using a micro filter (manufactured by Fujifilm Corporation) with a pore size of 3.0 μm to prepare each ink. A numerical value attached to polyethylene glycol in Table 3 is a number average molecular weight and "Acetylenol E100" is a trade name of the nonionic surfactant (acetylene glycol ethylene oxide adduct) manufactured by Kawaken Fine Chemicals Co., Ltd. A pH meter (trade name "F-21" manufactured by Horiba Ltd.) was used to measure pH of the prepared inks and the pH of each ink was within a range of 7.0 or more to 9.5 or less.

TABLE 3

Compositions and Features of Inks

| | Ink | | | | |
|---|---|---|---|---|---|
| | 2-1 | 2-2 | 2-3 | 2-4 | 2-5 |
| Fluorescent particle dispersed liquid 1 | 40.00 | | | | |
| Fluorescent particle dispersedl iquid 2 | | 40.00 | | | |
| Fluorescent particle dispersed liquid 3 | | | 40.00 | | |
| Fluorescent particle dispersed liquid 4 | | | | | 40.00 |
| Fluorescent dye aqueous solution | | | | 40.00 | |
| Glycerin | 15.00 | 15.00 | 15.00 | 15.00 | 15.00 |
| Triethylene glycol | 8.00 | 8.00 | 8.00 | 8.00 | 8.00 |
| Polyethylene glycol 1000 | 1.00 | 1.00 | 1.00 | 1.00 | 1.00 |
| Acetylenol E100 | 0.20 | 0.20 | 0.20 | 0.20 | 0.20 |
| Pure water | 35.80 | 35.80 | 35.80 | 35.80 | 35.80 |
| Content of fluorescent particle (%) | 8.00 | 8.00 | 9.60 | 0.00 | 9.60 |

(Ink 2-6)

First, 150 parts of polyester resin (glass-transition point 65° C., acid value 40 mgKOH/g) and 50 parts of C.I. Solvent Red 49 were dissolved into 500 parts of tetrahydrofuran. Then, 10 parts of dimethanolamine and 0.8 parts of sodium hydroxide were added and dissolved to obtain a solution. The obtained solution was added into 1000 parts of a 3% aqueous solution of a dispersant (trade name "Demol N" manufactured by Kao Corporation) while being agitated in a nitrogen atmosphere. Tetrahydrofuran was distilled away in reduced pressure and an ink 2-6 containing a fluorescent particle formed of the polyester resin and the fluorescent dye was obtained. The density $\rho_2$ of the fluorescent particle in the ink 2-6 was 1.00 g/cm$^3$.

Evaluation

There was prepared an ink jet recording apparatus (trade name "Pixus Pro 10-S" manufactured by Canon Inc.) equipped with a recording head that had ejection orifice rows for the first ink and the second ink arranged in a direction orthogonal to the main scanning direction. In the examples, an image recorded under a condition in which eight drops of 3.5 ng±10% of ink were applied to a unit area of 1/600 inches× 1/600 inches was defined to have a recording duty of 100%. Each of the prepared inks was filled into an ink cartridge and the ink cartridges were attached to the ink jet recording apparatus in combinations illustrated in Table 4. The first ink and the second ink were applied to a recording medium in the following conditions such that the area where the first ink was applied and the area where the second ink was applied overlapped each other, and a solid image of 2 cm×2 cm was recorded. The number of times of main scanning of the recording head in which the first ink and the second ink were applied to the unit area of the recording medium was the numbers described in Table 4. A ratio of the application amount (recording duty, unit: %) of the first ink to that of the second ink was set to 20% and 80%, 40% and 60%, 50% and 50%, 60% and 40% and 80% and 20%. A glossy paper (trade name "Canon Photo Paper Gloss Pro [Platinum Grade] PT-201" manufactured by Canon Inc.) was used as the recording medium. In the present invention, levels of "AAA", "AA", "A" and "B" are considered as acceptable levels and a level "C" is considered as an unacceptable level in evaluation criteria of the respective evaluation items described below. Evaluation Results are described in Table 4.

(Fluorescence Intensity)

An image of a gradation pattern including total of 25 types of solid images was recorded under a condition in which the inks were applied in the aforementioned five application amount ratio patterns with the total of the application amounts (recording duties) of the first ink and the second ink set to 20%, 40%, 60%, 80% and 100%. The recorded image was left to stand for one day in an environment of 25° C. Hue angle (H), chroma (C*) and lightness (L*) in the Lab color system were measured by using an M1 light source of a spectrophotometer (trade name "eXact" manufactured by X-Rite Incorporated). The fluorescence intensity of the image was evaluated according to the evaluation criteria described below, based on the measured hue angle (H). The lightness (L*) was evaluated by using a value at chroma (C*) of 50. When the maximum chroma did not reach 50, the lightness was evaluated by using a calculated value of the lightness at chroma (C*) of 50 obtained by extrapolating data obtained from color measurement of the gradation pattern. Evaluation criteria varying depending on the hue angle (H) were employed because a preferable color tone sensed by the eyes varies depending on the type of color.

[Case Where Hue Angle (H) was 0° or More to 180° or Less]

AAA: An image with a maximum chroma of 60 or more and lightness of 73 or more or an image with a maximum chroma of 50 or more and lightness of 85 or more was present among the five types of images.

AAA⁻: An image with a maximum chroma of 50 or more to less than 60 and lightness of 82 or more to less than 85 was present among the five types of images.

AA: An image with a maximum chroma of 50 or more to less than 60 and lightness of 79 or more to less than 82 was present among the five types of images.

A: An image with a maximum chroma of 50 or more to less than 60 and lightness of 76 or more to less than 79 was present among the five types of images.

B: An image with a maximum chroma of 50 or more to less than 60 and lightness of 73 or more to less than 76 was present among the five types of images.

C: The five types of images all had maximum chroma of less than 50 or lightness of less than 73.

[Case Where Hue Angle (H) was 180° or More to 360° or Less]

AAA: An image with a maximum chroma of 60 or more and lightness of 63 or more or an image with a maximum chroma of 50 or more and lightness of 75 or more was present among the five types of images.

AAA⁻: An image with a maximum chroma of 50 or more to less than 60 and lightness of 72 or more to less than 75 was present among the five types of images.

AA: An image with a maximum chroma of 50 or more to less than 60 and lightness of 69 or more to less than 72 was present among the five types of images.

A: An image with a maximum chroma of 50 or more to less than 60 and lightness of 66 or more to less than 69 was present among the five types of images.

B: An image with a maximum chroma of 50 or more to less than 60 and lightness of 63 or more to less than 66 was present among the five types of images.

C: The five types of images all had maximum chroma of less than 50 or lightness of less than 63.

(Color Gamut)

An image of a gradation pattern including total of five types of solid images was recorded under a condition in which the first and second inks were applied in the aforementioned five application amount ratio patterns with the total of the application amounts (recording duties) of the first ink and the second ink set to 100%. The recorded image was left to stand for one day in an environment of 25° C. Hue angle (H), color (a*, b*) and lightness (L*) in the Lab color system were measured by using an M1 light source of a spectrophotometer (trade name "eXact" manufactured by X-Rite Incorporated) and a color gamut of the image was evaluated according to the evaluation criteria described below. The hue angle (H) was calculated from a corresponding one of the following formulae divided for the respective cases of the first quadrant (a*≥0, b*≥0), the second quadrant (a*≤0, b*≥0), the third quadrant (a*≤0, b*≤0) and the fourth quadrant (a*≥0, b*≤0).

[First Quadrant]: $H° = \tan^{-1}(b^*/a^*)$
[Second Quadrant]: $H° = 180° + \tan^{-1}(b^*/a^*)$
[Third Quadrant]: $H° = 180° + \tan^{-1}(b^*/a^*)$
[Fourth Quadrant]: $H° = 360° + \tan^{-1}(b^*/a^*)$ A: The difference between the maximum value and the minimum value of the hue angle was 20° or more.

C: The difference between the maximum value and the minimum value of the hue angle was less than 20°.

TABLE 4

Evaluation Conditions, Evaluation Results

| | | | First ink | Second ink | $\lambda_1$ (nm) | $\lambda_2$/ (nm) | Value of $A_{\lambda 2}/A_{\lambda 1}$ | Number of times of main scanning by recording head (times) | Fluorescence intensity | Color gamut |
|---|---|---|---|---|---|---|---|---|---|---|
| Example | 1 | | 1-1 | 2-1 | 555 | 580 | 0.4 | 8 | AAA | A |
| | 2 | | 1-2 | 2-1 | 555 | 580 | 0.4 | 8 | AAA | A |
| | 3 | | 1-3 | 2-1 | 535 | 580 | 0.1 | 8 | AAA | A |
| | 4 | | 1-4 | 2-1 | 473 | 580 | 0.2 | 8 | AAA | A |
| | 5 | | 1-5 | 2-1 | 380 | 580 | 0.5 | 8 | AAA | A |
| | 6 | | 1-6 | 2-1 | 533 | 580 | 0.7 | 8 | AA | A |
| | 9 | | 1-7 | 2-1 | 433 | 580 | 0.1 | 8 | AA | A |
| | 7 | | 1-8 | 2-1 | 644 | 580 | 0.3 | 8 | AA | A |
| | 8 | | 1-9 | 2-1 | 615 | 580 | 0.7 | 8 | A | A |

TABLE 4-continued

Evaluation Conditions, Evaluation Results

|  |  | First ink | Second ink | $\lambda_1$ (nm) | $\lambda_2$ (nm) | Value of $A_{\lambda 2}/A_{\lambda 1}$ | Number of times of main scanning by recording head (times) | Fluorescence intensity | Color gamut |
|---|---|---|---|---|---|---|---|---|---|
|  | 10 | 1-10 | 2-1 | 555 | 580 | 0.4 | 8 | AAA− | A |
|  | 11 | 1-11 | 2-1 | 555 | 580 | 0.4 | 8 | AA | A |
|  | 12 | 1-12 | 2-1 | 555 | 580 | 0.4 | 8 | AAA | A |
|  | 13 | 1-13 | 2-1 | 555 | 580 | 0.4 | 8 | AAA | A |
|  | 14 | 1-14 | 2-1 | 555 | 580 | 0.4 | 8 | AAA | A |
|  | 15 | 1-15 | 2-1 | 555 | 580 | 0.4 | 8 | AAA− | A |
|  | 16 | 1-16 | 2-1 | 555 | 580 | 0.4 | 8 | AAA− | A |
|  | 17 | 1-17 | 2-1 | 555 | 580 | 0.4 | 8 | AA | A |
|  | 18 | 1-1 | 2-2 | 555 | 520 | 0.4 | 8 | AA | A |
|  | 19 | 1-1 | 2-3 | 555 | 580 | 0.4 | 8 | AAA | A |
|  | 20 | 1-1 | 2-1 | 555 | 580 | 0.4 | 3 | AA | A |
|  | 21 | 1-1 | 2-1 | 555 | 580 | 0.4 | 4 | AAA | A |
|  | 22 | 1-1 | 2-1 | 555 | 580 | 0.4 | 16 | AAA | A |
|  | 23 | 1-1 | 2-1 | 555 | 580 | 0.4 | 17 | AA | A |
|  | 24 | 1-18 | 2-1 | 615 | 580 | 0.7 | 3 | B | A |
| Comparative example | 1 | 1-19 | 2-1 | 555 | 580 | 0.4 | 4 | C | A |
|  | 2 | 1-20 | 2-1 | 555 | 580 | 0.4 | 4 | C | A |
|  | 3 | 1-1 | 2-4 | 555 | 580 | 0.4 | 4 | C | A |
|  | 4 | 1-21 | 2-5 | 402 | 580 | 0.1 | 4 | C | A |
|  | 5 | 1-22 | 2-5 | 570 | 580 | 0.6 | 4 | C | A |
|  | 6 | 1-23 | — | 570 | 580 | 0.6 | 4 | A | C |
|  | 7 | 1-24 | 2-6 | 433 | 580 | 0.1 | 4 | C | A |
|  | 8 | 1-25 | — | 555 | 580 | 0.4 | 4 | A | C |

As described above, the present invention can provide an ink jet recording method that enables recording of an image with a wide expressible color gamut and high fluorescence intensity. Moreover, the present invention can provide an ink jet recording apparatus that uses this ink jet recording method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-013658, filed Jan. 29, 2021, Japanese Patent Application No. 2021-013659, filed Jan. 29, 2021, and Japanese Patent Application No. 2021-203243, filed Dec. 15, 2021, which are hereby incorporated by reference herein in their entirety.

What is claimed is:

1. An ink jet recording method comprising a step of recording an image by applying a first ink and a second ink to a recording medium by using an ink jet recording apparatus such that an area where the first ink is applied and an area where the second ink is applied at least partially overlap each other, the ink jet recording apparatus including a recording head having ejection orifices to eject the first ink and the second ink, respectively,
wherein the first ink comprises a water-soluble organic solvent, an alkaline buffer, and a pigment particle that is a pigment dispersed by an effect of an anionic group,
wherein a content of the water-soluble organic solvent in the first ink is 3.00% by mass or more to 50.00% by mass or less based on the total mass of the first ink, and a content of the alkaline buffer in the first ink is 0.01% by mass or more to 5.00% by mass or less based on the total mass of the first ink,
wherein the second ink comprises a fluorescent particle dispersed by an effect of an anionic group, and
wherein a density $\rho_1$ of the pigment particle is more than a density $\rho_2$ of the fluorescent particle.

2. The ink jet recording method according to claim 1, wherein the pigment particle satisfies a relationship of a formula (1):

$$A_{\lambda 2}/A_{\lambda 1} \leq 0.5 \qquad \text{formula (1),}$$

where
$A_{\lambda 1}$ is an absorbance of the pigment particle at a maximum absorption wavelength $\lambda_1$ nm of the pigment particle, and
$A_{\lambda 2}$ is an absorbance of the pigment particle at a maximum fluorescence wavelength $\lambda_2$ nm of the fluorescent particle.

3. The ink jet recording method according to claim 1, wherein the pigment particle comprises at least one pigment selected from a group consisting of carbon black, quinacridone, perinone, perylene, dioxazine, azo, and phthalocyanine.

4. The ink jet recording method according to claim 1, wherein the pigment particle comprises quinacridone.

5. The ink jet recording method according to claim 1, wherein the pigment particle comprises a pigment formed of a molecule having a fused ring constituted of fusing of five or more rings.

6. The ink jet recording method according to claim 1, wherein the pigment particle is a pigment dispersed by a resin having an anionic group.

7. The ink jet recording method according to claim 1, wherein a content of the pigment particle in the first ink is 0.10% by mass or more to 10.00% by mass or less based on a total mass of the first ink.

8. The ink jet recording method according to claim 1, wherein the density $\rho_1$ of the pigment particle is 1.45 g/cm$^3$ or more to 5.00 g/cm$^3$ or less.

9. The ink jet recording method according to claim 1, wherein pKa of the alkaline buffer at 25° C. is 7.6 or more to 10.4 or less.

10. The ink jet recording method according to claim 1, wherein the alkaline buffer is a tertiary amine compound.

11. The ink jet recording method according to claim 1, wherein a content of the alkaline buffer in the first ink is 0.10% by mass or more to 3.00% by mass or less based on a total mass of the first ink.

12. The ink jet recording method according to claim 1, wherein the first ink further comprises a nonionic siloxane compound.

13. The ink jet recording method according to claim 1, wherein the fluorescent particle is a resin particle dyed with a coloring material that exhibits fluorescence.

14. The ink jet recording method according to claim 13, wherein the coloring material that exhibits fluorescence is a basic dye.

15. The ink jet recording method according to claim 13, wherein the coloring material that exhibits fluorescence is a compound with a xanthene skeleton.

16. The ink jet recording method according to claim 1, wherein a content of the fluorescent particle in the second ink is 0.10% by mass or more to 15.00% by mass or less based on a total mass of the second ink.

17. The ink jet recording method according to claim 1, wherein the density $\rho_2$ of the fluorescent particle is 1.00 g/cm$^3$ or more to 1.50 g/cm$^3$ or less.

18. The ink jet recording method according to claim 1, wherein the first ink and the second ink are applied to a unit area of the recording medium by performing main scanning of the recording head 4 times or more to 16 times or less.

19. The ink jet recording method according to claim 1, wherein pKa of the alkaline buffer at 25° C. is 7.6 or more to 9.3 or less.

20. The ink jet recording method according to claim 1, wherein the alkaline buffer is at least one selected from the group consisting of diethanolamine, diisopropanolamine, triethanolamine, triisopropanolamine, tributylamine, trihexylamine, N-cyclohexyl-3-aminopropanesulfonic acid, N-cyclohexyl-2-aminoethanesulfonic acid and N,N-bis(2-hydroxyethyl)glycine.

21. The ink jet recording method according to claim 13, wherein the resin particle has a core-shell structure that includes (i) a core portion having an aromatic group containing unit and a cyano group containing unit and (ii) a shell portion coating the core portion and having an aromatic group containing unit and an anionic group containing unit.

22. An ink jet recording apparatus comprising a first ink, a second ink, and a recording head having ejection orifices to eject the first ink and the second ink, respectively, wherein the ink jet recording apparatus records an image by applying the first ink and the second ink to a recording medium such that an area where the first ink is applied and an area where the second ink is applied at least partially overlap each other, wherein the first ink comprises a water-soluble organic solvent, an alkaline buffer, and a pigment particle that is a pigment dispersed by an effect of an anionic group, wherein a content of the water-soluble organic solvent in the first ink is 3.00% by mass or more to 50.00% by mass or less based on the total mass of the first ink, and a content of the alkaline buffer in the first ink is 0.01% by mass or more to 5.00% by mass or less based on the total mass of the first ink, wherein the second ink comprises a fluorescent particle dispersed by an effect of an anionic group, and wherein a density $\rho_1$ of the pigment particle is more than a density $\rho_2$ of the fluorescent particle.

* * * * *